(12) United States Patent
Kubota et al.

(10) Patent No.: US 8,699,145 B2
(45) Date of Patent: Apr. 15, 2014

(54) ZOOM LENS

(75) Inventors: Yoji Kubota, Nagano (JP); Kenichi Kubota, Nagano (JP); Hitoshi Hirano, Nagano (JP)

(73) Assignees: Optical Logic Inc., Nagano (JP); Kantatsu Co., Ltd., Tochigi (JP)

( * ) Notice: Subject to any disclaimer, the term of this patent is extended or adjusted under 35 U.S.C. 154(b) by 167 days.

(21) Appl. No.: 13/455,479

(22) Filed: Apr. 25, 2012

(65) Prior Publication Data

US 2012/0293871 A1 Nov. 22, 2012

Related U.S. Application Data

(60) Provisional application No. 61/480,205, filed on Apr. 28, 2011.

(51) Int. Cl.
*G02B 15/14* (2006.01)

(52) U.S. Cl.
USPC .......................................................... 359/686

(58) Field of Classification Search
USPC ................................................. 359/686, 781
See application file for complete search history.

(56) References Cited

U.S. PATENT DOCUMENTS 7,405,887 B2 * 7/2008 Iwasawa ...................... 359/691

FOREIGN PATENT DOCUMENTS

JP        2001-343588        12/2001

* cited by examiner

*Primary Examiner* — Joseph P Martinez
(74) *Attorney, Agent, or Firm* — Kubotera & Associates, LLC

(57) ABSTRACT

A zoom lens includes a first lens group, a second lens group, a third lens group, and a fourth lens group. The first lens group includes a first lens that has positive refractive power, a second lens that has negative refractive power, and a prism. The second lens group includes a third lens that has positive refractive power and a fourth lens that has negative refractive power. The third lens group includes a stop, a fifth lens that has positive refractive power, and a sixth lens that has negative refractive power. The fourth lens group includes a seventh lens that has positive refractive power. Upon changing magnification from a wide-angle end to a telephoto end, the first and fourth lens groups are fixed, the second lens group first moves toward an image plane side and then moves toward an object side, and the third lens group linearly moves toward the object side.

14 Claims, 20 Drawing Sheets

Wide-angle end

Spherical aberration (mm)    Astigmatism (mm)    Distortion (%)

Mid-point

Spherical aberration (mm)    Astigmatism (mm)    Distortion (%)

Telephoto end

Spherical aberration (mm)    Astigmatism (mm)    Distortion (%)

Wide-angle end

Mid-point

Telephoto end

Wide-angle end

Spherical aberration (mm)

Astigmatism (mm)

Distortion (%)

Mid-point

Spherical aberration (mm)

Astigmatism (mm)

Distortion (%)

Telephoto end

Spherical aberration (mm)

Astigmatism (mm)

Distortion (%)

ZOOM LENS

CROSS-REFERENCE TO RELATED APPLICATIONS

The application claims the benefit under 35 U.S.C. 119(e) of the provisional application No. 61/480,205, filed on Apr. 28, 2011.

BACKGROUND OF THE INVENTION AND RELATED ART STATEMENT

The present invention relates to a zoom lens for forming an image on an imaging element such as a CCD sensor and a CMOS sensor.

In these years, there are studies on mounting a zoom lens on a small device such as a cellular phone, a portable information terminal, and an internet camera as well as a digital still camera for another additional value, and devices actually equipped with zoom lenses became available. A zoom lens is an optical system, in which a part of lenses or lens groups that compose a lens system moves along an optical axis, whereby it is possible to continuously change imaging magnification. Mounting a zoom lens, a user can increase and/or decrease an image of an object to any sizes upon taking the image.

In case of mounting such zoom lens onto a small-sized device, the whole length of the zoom lens is preferably as short as possible. In case of a zoom lens, however, since it is necessary to move at least two of lens groups that compose the zoom lens upon changing magnification and focusing, it is necessary to secure space within the zoom lens to be able to move those lens groups therein. Such necessity makes difficult to attain miniaturization of the zoom lens.

On the other hand, the number of pixels to take an image as electrical signals has increased each year, and therefore a zoom lens is also required to exhibit high performances such as satisfactory aberration correction performance and compatibility to high resolution. Patent Reference describes a zoom lens, which includes a first lens group that is composed of a lens having negative refractive power; a second lens group that is composed of two lenses, a positive and a negative lenses, so as to have negative refractive power as a whole; a third lens group having positive refractive power; and a fourth lens group having positive refractive power. According to this zoom lens, restraining a composite focal length of the first lens group and the second lens group at a wide-angle end within a certain range, it is possible to attain relatively satisfactory miniaturization in spite of its high magnification change, which is as high as three times. Patent Reference: Japanese Patent Publication No. 2001-343588

The zoom lens described in Patent Reference does not fully satisfy the demands for high performances and miniaturization, although it is possible to relatively satisfactorily correct aberrations with a small number of lenses.

Here, such demands for high performances and miniaturization are not demanded only in small-sized devices such as cellular phones. Even in devices such as digital still cameras, there is a demand for changing magnification of an image, especially optically changing of magnification with less image deterioration, whereas there is also a demand for a smaller thickness to enhance portability.

In view of the above-described problems, an object of the invention is to provide a small-sized zoom lens with high performances that can provide satisfactory high image quality.

SUMMARY OF THE INVENTION

In order to attain the object described above, according to the present invention, a zoom lens includes a first lens group having negative refractive power; a second lens group having negative refractive power; a third lens group having positive refractive power; and a fourth lens group having positive refractive power, arranged in the order from an object side to an image plane side. The first lens group is composed of a lens having positive refractive power so that a curvature radius of a surface thereof on the object side is positive, a lens having negative refractive power so that a curvature radius of a surface thereof on the image plane side is positive, and a light path changing member that is provided closer to the image plane side relative to those lenses and changes a traveling direction of an incident light. The second lens group is composed of a lens having positive refractive power so that a curvature radius of a surface thereof on the object side is positive and a lens having negative refractive power so that a curvature radius of a surface thereof on the object side is negative. The third lens group is composed of a lens having positive refractive power and a lens group having negative refractive power as a whole.

In addition, the zoom lens of the invention is configured so that, upon changing magnification from a wide-angle end to a telephoto end, the first lens group and the fourth lens group are secured, and at the same time, the second lens group first moves to the image plane side and then moves to the object side, and the third lens group linearly moves to the object side.

According to this configuration, the lens groups that move upon changing magnification and focusing are only two lens groups, i.e. the second lens group and the third lens group. Furthermore, among them, the second lens group is composed of two lenses, a positive lens and a negative lens. Therefore, a chromatic aberration of magnification and distortion occurred in the first lens group are satisfactorily corrected with the two lenses, i.e. the positive and negative lenses of the second lens group. Moreover, since the second lens group first moves to the image plane side and then moves to the object side upon changing the magnification from the wide-angle end to the telephoto end, the trajectory of the movement is concave on the object side. According to the zoom lens of the invention, it is possible to minimize space to secure to move the lens groups in comparison with a zoom lens, in which a second lens group linearly or parabolicaly moves.

In addition, according to the zoom lens of the invention, since the two lenses, i.e. positive and negative lenses, that are a lens having positive refractive power so that a curvature radius of a surface thereof on the object side is positive and a lens having negative refractive power so that a curvature radius of a surface thereof on the image plane side is positive, are arranged closer to the object side relative to the light path changing member. Therefore, it is possible to more satisfactorily correct the chromatic aberration of magnification and the distortion (especially distortion accrued at the wide-angle end) with the two lenses, the positive and the negative lenses, which compose the first lens group. Accordingly, employing such configuration in a zoom lens, it is possible to attain both high performances and miniaturization.

In the zoom lens having the above-described configuration, it is possible to use as the light path changing member a prism that reflects an incident light to bend a light path. Using such prism, it is possible to form a bent-type (L-shaped) zoom lens. Especially in case of small-sized portable devices such as cellular phones, space to mount a zoom lens is very limited. According to the invention, it is possible to significantly reduce a thickness of a device to mount a zoom lens.

According to the zoom lens having the above-described configuration, preferably, in the first lens configuration, a bonded lens is disposed closer to the object side relative to the light path changing member, and the bonded lens is composed of a lens having a positive curvature radius on the object-side surface thereof and a negative curvature radius on the image-side surface thereof, and a lens having negative curvature radius on the object-side surface thereof and positive curvature radius on the image-side surface thereof.

Alternatively, in the first lens configuration, it is also possible to dispose two lenses that have positive curvature radii on the object-side surfaces and the image-side surfaces thereof closer the object side relative to the light path changing member.

Moreover, in the first lens group configuration, it is possible to increase an imaging angle of view of the zoom lens by disposing a first lens having negative refractive power, a second lens having positive refractive power, and a light path changing member, arranged in the order from the object side to the image plane side. Disposing the first lens having negative refractive power at a position closest to the object side in this way, it is possible to increase the imaging angle of view of the zoom lens. Especially in these years, a zoom lens also highly requires a wider imaging angle of view, similarly to a fixed focal length lens. Such wider angle of view enhances added value of the zoom lens and also contributes to attain higher performances of the zoom lens.

When a lens having positive refractive power in the first lens group has a focal length $f1p$ and the lens having negative refractive power in the first lens group has a focal length $f1n$, the zoom lens having the above-described configuration preferably satisfies the following conditional expression (1):

$$|f1n/f1p|<0.8 \quad (1)$$

When the zoom lens satisfies the conditional expression (1), it is possible to restrain the chromatic aberration and the distortion within satisfactory ranges over the whole range of magnification changes. If the value is outside the range set by the conditional expression (1), the lens having positive refractive power in the first lens group has relatively strong refractive power, so that, although it is possible to satisfactorily correct the distortion at the wide angle end, the axial chromatic aberration at a short wavelength is in a minus direction (on the object side) relative to that at a reference wavelength, so that the axial chromatic aberration is insufficiently corrected. On the other hand, since the off-axis chromatic aberration of magnification at a short wavelength is in a plus direction relative to that at a reference wavelength, so that the off-axial aberration of magnification is excessively corrected. As a result, it is difficult to obtain satisfactory imaging performance.

When the first lens group has a focal length $f1$ and the second lens group has a focal length $f2$, the zoom lens having the above-described configuration preferably satisfies the following conditional expression (2):

$$0.2<f2/f1<1.0 \quad (2)$$

When the zoom lens satisfies the conditional expression (2), it is possible to restrain aberrations within satisfactory ranges over the whole range of magnification changes while attaining miniaturization of the zoom lens. When the value exceeds the upper limit "1.0", the second lens group has relatively weak refractive power and the amount of movement of the second lens group upon changing magnification and focusing increases. For this reason, changes of aberrations increase and it is difficult to restrain the aberrations within satisfactory ranges over the whole range of magnification changes. On the other hand, when the value is below the lower limit "0.2", since the second lens group has relatively strong refractive power, it is necessary to increase a diameter of a lens that composes the first lens group in order to secure an angle of view at the wide angle end, so that it is difficult to attain miniaturization of the zoom lens.

When the first lens group has the focal length $f1$ and the third lens group has a focal length $f3$, the zoom lens having the above-described configuration preferably satisfies the following conditional expression (3):

$$0.05<|f3/f1|<0.5 \quad (3)$$

When the zoom lens satisfies the conditional expression (3), it is possible to define a moving mode of the second lens group and keep the off-axis imaging performance at a certain level over the whole range of magnification changes. When the zoom lens satisfies the conditional expression (3), it is possible to have a position of the second lens group on the optical axis at the wide angle end approximately coincide with a position of the second lens group on the optical axis at the telephoto end. In other words, when the zoom lens satisfies the conditional expression (3), the distance between the first lens group and the second lens group is substantially constant at the wide angle end and the telephoto end, and thereby it is possible to suitably attain miniaturization of the zoom lens.

Here, in the conditional expression (3), when the value exceeds the upper limit "0.5", the first lens group has relatively strong refractive power, so that the second lens group significantly moves to the object side at the telephoto end, so that it is difficult to attain miniaturization of the zoom lens. In addition, it is difficult to restrain axial chromatic aberration, off-axis chromatic aberration of magnification, and off-axis coma aberration within satisfactory ranges. On the other hand, when the value is below the lower limit "0.05", the first lens group has relatively weak refractive power, and a diameter of a lens that composes the first lens group is large, and the second lens group significantly moves to the image plane side at the telephoto end, so that it is difficult to attain miniaturization of the zoom lens also in this case.

When a composite focal length of the first lens group, the second lens group, the third lens group, and the fourth lens group at the wide angle end is $fw$ and the third lens group has a focal length $f3$, the zoom lens having the above-described configuration preferably satisfies the following conditional expression (4):

$$1.0<f3/fw<2.0 \quad (4)$$

When the zoom lens satisfies the conditional expression (4), it is possible to define the size of the whole zoom lens and refractive power of each lens group. When the value exceeds the upper limit "2.0", the third lens group has weak refractive power, which is effective to correct aberrations, but it is difficult to attain miniaturization of the zoom lens. On the other hand, when the value is below the lower limit "1.0", the third lens group, which moves upon changing magnification, has strong refractive power, which is advantageous for miniaturization of the zoom lens, but it is difficult to keep the balance among a spherical aberration, coma aberration, and field curvature within certain range over the whole range of magnification changes. Moreover, since a curvature radius of a lens that composes each lens group is small, the fabrication performance of the lens is poor, which results in increase of manufacturing cost of the zoom lens.

When the lens having positive refractive power in the third lens group has a focal length $f3p$ and the lens group having negative refractive power in the third lens group has a composite focal length $f3n$, the zoom lens having the above-described configuration preferably satisfies the following conditional expression (5):

$$0.1<|f3p/f3n|<1.0 \quad (5)$$

When the zoom lens satisfies the conditional expression (5), it is possible to attain further miniaturization and keep balance of aberrations such as spherical aberration and coma aberration within certain range over the whole range of magnification changes. If the value exceeds the upper limit "1.0", since the lens group having negative refractive power in the third lens group relatively has strong refractive power, the axial chromatic aberration is excessively corrected and it is difficult to keep the balance between spherical aberrations and coma aberrations at the wide-angle end and the telephoto end within certain range. In addition, since a curvature radius of a lens that composes the third lens group is small, fabrication performance of the lens is deteriorated, which also results in increase of manufacturing cost of the zoom lens. On the other hand, when the value is below the lower limit "0.1", since the lens having positive refractive power in the third lens group has relatively strong refractive power, it is difficult to attain miniaturization of the zoom lens.

When the lens having positive refractive power in the first lens group has Abbe's number vd1$p$ and the lens having negative refractive power in the first lens group has Abbe's number vd1$n$, the zoom lens having the above-described configuration preferably satisfies the following conditional expression (6):

$$|vd1n-vd1p|<30 \qquad (6)$$

When the zoom lens satisfies the conditional expression (6), it is possible to restrain the axial chromatic aberration and the off-axis chromatic aberration of magnification in a balanced manner within satisfactory ranges over the whole range of magnification changes. When the value is outside the range set by the conditional expression (6), the axial chromatic aberration is insufficiently corrected and the off-axis chromatic aberration of magnification is excessively corrected, so that it is difficult to obtain satisfactory imaging performance.

According to the zoom lens of the invention, it is possible to provide a small-sized zoom lens with high performances that meet with high image quality demand.

DETAILED DESCRIPTION OF PREFERRED EMBODIMENTS

Hereunder, referring to the accompanying drawings, an embodiment of the present invention will be fully described.

FIGS. 1, 6, 11, and 16 are sectional views of zoom lenses in Numerical Data Examples 1 to 4 according to the embodiment, respectively. The figures show a lens sectional view at a wide-angle end, a lens sectional view at a mid point between the wide-angle end and a telephoto end, and a lens sectional view at the telephoto end, respectively. Since a basic lens configuration is the same among those Numerical Data Examples, the lens configuration of the embodiment will be described with reference to the lens sectional view of Numerical Data Example 1.

Figure 1:
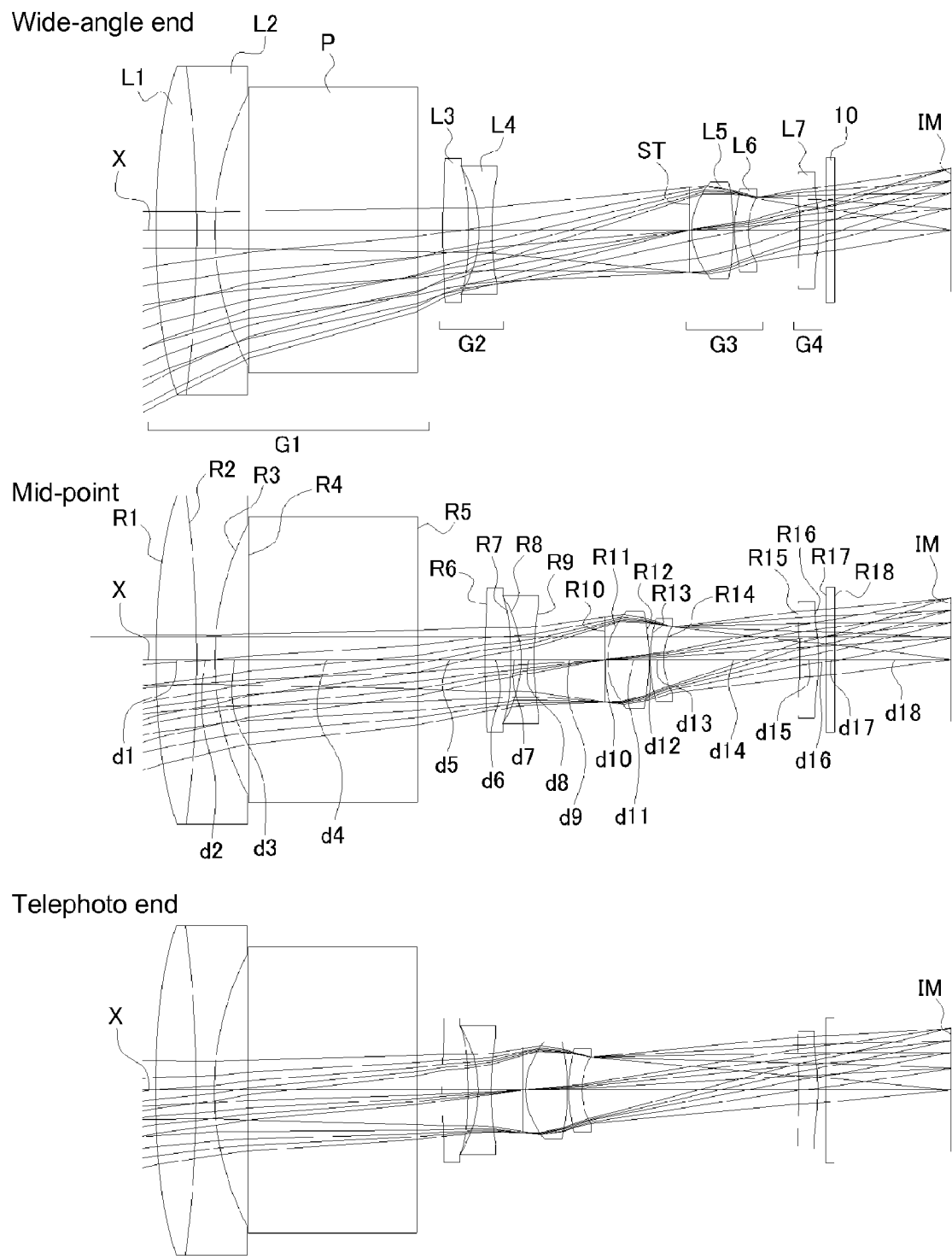
FIG. 1 shows sectional views of a zoom lens at a wide-angle end, a mid point, and a telephoto end in Numerical Data Example 1 according to an embodiment of the invention.

The zoom lens of the embodiment is composed of four lens groups. As shown in FIG. 1, the zoom lens includes a first lens group G1 having negative refractive power, a second lens group G2 having negative refractive power, a third lens group G3 having positive refractive power, and a fourth lens group G4 having positive refractive power, arranged in the order from an object side to an image plane side. A filter 10 may be provided between the fourth lens group G4 and an image plane IM of an imaging element, but the filter 10 may be optionally omitted.

In addition, according to the zoom lens of the embodiment, the first lens group G1 and the fourth lens group G4 are secured, and the second lens group G2 and the third lens group G3 are configured so as to be able to move along an optical axis X. In the configuration, upon changing magnification from the wide-angle end to the telephoto end, the second lens group G2 first moves to the image plane side and then moves to the object side, and the third lens group G3 moves to the object side along the optical axis X. More specifically, the second lens group G2 moves along the optical axis X drawing a trajectory that is concave on the object side, and the third lens group G3 moves along the optical axis X drawing a linear trajectory in a direction that approaches the second lens group G2.

As described above, according to the zoom lens of the embodiment, the magnification changes as the third lens group G3 moves, and focusing and back focal length adjustment are done by moving the second lens group G2, and an image point is kept constant over the whole range of magnification changes.

According to the zoom lens having the above-described configuration, the first lens group G1 includes a first lens L1 having positive refractive power, a second lens L2 having negative refractive power, and a prism P (a light path changing member) that reflects an incident light to bend it at a right angle, arranged in the order from the object side. The first lens L1 is formed in a shape so that a curvature radius of a surface thereof on the object side is positive and a curvature radius of a surface thereof on the image plane side is negative, i.e. a shape of a biconvex lens near the optical axis X. The second lens L2 is formed in a shape so that a curvature radius of a surface thereof on the object side is negative and a curvature radius of a surface thereof on the image plane side is positive, i.e. a shape of a biconcave lens near the optical axis X. The first lens L1 and the second lens L2 compose a bonded lens having a surface of the first lens L1 on the image plane side and a surface of the second lens L2 on the object side bonded to each other.

Here, the configuration of the bonded lens that composes the first lens group G1 is not limited to the one in the embodiment. It is also possible to arrange a first lens L1 having negative refractive power and a second lens L2 having positive refractive power in the order from the object side, and compose a bonded lens by bonding the first lens L1 and the second lens L2. In addition, the respective shapes of the first lens L1 and the second lens L2 are not limited to those in the embodiment. It is possible to form the first lens L1 and the second lens L2 in shapes so that a curvature radius of a surface thereof on the object side and a curvature radius of a surface thereof on the image plane side are both positive, i.e. shapes of meniscus lenses directing their convex surfaces to the object side near the optical axis X and compose a bonded lens by bonding the first lens L1 and the second lens L2. Furthermore, it is also possible to arrange the first lens L1 and the second lens L2 being separated from each other without bonding. The zoom lenses of Numerical Data Example 3 and 4 are examples in which the first lens L1 and the second lens L2 are arranged being separated from each other.

According to the embodiment, the prism P is employed as a light path changing member. Using the prism P as a light path changing member, it is possible to configure a bent-type (L-shaped) zoom lens. Especially in case of a small-sized portable device such as a cellular phone, space to mount a zoom lens is extremely limited and often, there may not be enough space in the thickness of the device upon designing. When the invention is embodied as a bent-type zoom lens, it is possible to significantly reduce the thickness of the device and also contribute in attaining miniaturization and small thickness of a portable device.

Here, the light path changing member is not limited to the prism P in this embodiment. For example, it is also possible to arrange a flat mirror behind the second lens L2, so as to reflect an incident light from the second lens L2 and bend it at a right angle using the mirror (light path changing member). Moreover, when it is relatively easy to secure space to mount a zoom lens, it is also possible to configure to be able to use a lens as the light path changing member. Using a lens as the light path changing member, it is possible to further satisfactorily correct aberrations. In short, it is possible to use various members as the light path changing member as long as it is a optical member, and it is possible to suitably use any of prisms, mirrors, and lenses, or combination of them. Here, for convenience, in lens sectional views FIGS. 1, 6, 11, and 16, the prism P is shown as a parallel flat plate that is equivalent to the optical path length.

The second lens group G2 includes a third lens L3 having positive refractive power and the fourth lens L4 having negative refractive power in the order from the object side. The third lens L3 is formed in a shape so that a curvature radius of a surface thereof on the object side is positive and a curvature radius of a surface thereof on the image plane side is negative, i.e. a shape of a biconvex lens near the optical axis X. Here, the shape of the third lens L3 is not limited to a shape of a biconvex lens near the optical axis X, and can be any as long as a curvature radius of a surface thereof on the object side is positive. Such shape of the third lens L3 may also be a shape so that a curvature radius of a surface thereof on the object side and a curvature radius of a surface thereof on the image plane side are both positive, i.e. a shape of a meniscus lens directing a convex surface thereof to the object side near the optical axis X.

The fourth lens L4 is formed in a shape so that a curvature radius of a surface thereof on the object side is negative and a curvature radius of a surface thereof on the image plane side is positive, i.e. a shape of a biconcave lens near the optical axis X. Here, a shape of the fourth lens L4 is not limited to a shape of a biconcave lens near the optical axis X, and may be any as long as a curvature radius of a surface thereof on the object side is negative. The shape of the fourth lens L4 may be also formed in a shape so that a curvature radius of a surface thereof on the object side and a curvature radius of a surface thereof on the image plane side are both negative, i.e. a shape of a meniscus lens directing a concave surface thereof to the object side near the optical axis X.

Moreover, arrangements of the third lens L3 and the fourth lens L4 in the second lens group G2 are not limited to the one in the embodiment. Alternatively, it is also possible to switch the arrangements of the third lens L3 and the fourth lens L4 on the optical axis X and dispose the fourth lens L4 on the object side and the third lens L3 on the image plane side in the second lens group G2. In other words, the second lens group G2 can have any configuration as long as the composite refractive power of the two lenses, i.e. positive and negative lenses, is negative.

The third lens group G3 includes a stop ST, a fifth lens L5 having positive refractive power, and a sixth lens L6 having negative refractive power, arranged in the order from the object side. Among them, the fifth lens L5 is formed in a shape of a biconvex lens near the optical axis X. The sixth lens L6 is formed in a shape of a meniscus lens directing a convex surface thereof to the object side near the optical axis X.

Here, the third lens group G3 may be also configured to include the stop ST, a lens having positive refractive power, and a lens group having negative refractive power as a whole, arranged in the order from the object side. For example, it is possible to compose the sixth lens L6 from two lenses, so that composite refractive power of the two lenses is negative. The combination of lenses that compose the lens group may be possibly a combination of a lens having positive refractive power and a lens having negative refractive power, and a combination of two lenses having negative refractive power. The number of lenses that compose the lens group may be determined in view of smallness of the zoom lens.

The fourth lens group G4 includes a seventh lens L7 having positive refractive power (an eighth lens L8 in Numerical Data Example 4). The seventh lens L7 is formed in a shape so that a curvature radius of a surface thereof on the object side and a curvature radius of a surface thereof on the image plane side are both negative, i.e. a shape of a meniscus lens directing a concave surface thereof to the object side near the optical axis X.

In the embodiment, each lens has a lens surface that is formed to be an aspheric surface as necessary. When the aspheric surfaces applied to the lens surfaces have an axis Z in the optical axis direction, a height H in a direction perpendicular to the optical axis, a conical coefficient k, and aspheric coefficients $A_4, A_6, A_8, A_{10}, A_{12}, A_{14}$, and $A_{16}$, a shape of the aspheric surfaces of the lens surfaces may be expressed as follows:

$$Z = \frac{\frac{H^2}{R}}{1 + \sqrt{1 - (k+1)\frac{H^2}{R^2}}} + A_4H^4 + A_6H^6 +$$

$$A_8H^8 + A_{10}H^{10} + A_{12}H^{12} + A_{14}H^{14} + A_{16}H^{16}$$

[Formula 1]

In addition, when the first lens group G1 has a focal length f1, the second lens group G2 has a focal length f2, the third lens group G3 has a focal length f3, a composite focal length of the first lens group G1 to the fourth lens group G4 at the wide-angle end is fw, the first lens L1 has a focal length f1$p$, the second lens L2 has a focal length f1$n$, the fifth lens L5 has a focal length f3$p$, the sixth lens L6 has a focal length f3$n$, the first lens L1 has Abbe's number vd1$p$, and the second lens L2 has Abbe's number vd1$n$, the zoom lens of the embodiment satisfies the following conditional expressions (1) to (6):

$|f1n/f1p|<0.8$ (1)

$0.2<f2/f1<1.0$ (2)

$0.05<|f3/f1|<0.5$ (3)

$1.0<f3/fw<2.0$ (4)

$0.1<|f3p/f3n|<1.0$ (5)

$|vd1n-vd1p|<30$ (6)

In order to more satisfactorily correct a chromatic aberration, the zoom lens of the embodiment preferably further satisfies the following conditional expression (6A):

$|vd1n-vd1p|<15$ (6A)

Here, it is not necessary to satisfy all of the conditional expressions (1) to (6A). When any single one of the conditional expressions (1) to (6A) is individually satisfied, it is possible to obtain an effect corresponding to the respective conditional expression and configure a small-sized zoom lens that can provide high image quality and high performance in comparison with a conventional zoom lens.

Next, Numerical Data Examples of the zoom lens of the embodiment will be described. In each Numerical Data Example, a back focal length BF is a distance from a surface of the seventh lens L7 on the image plane side to a paraxial image plane, which is indicated as a length in air, and a total optical track length L is obtained by adding the back focal length BF to a distance from the surface of the first lens L1 on the object side to the surface of the seventh lens L7 on the image plane side.

In addition, i represents a surface number counted from the object side, R represents a curvature radius, d represents a distance between lens surfaces (surface spacing) on the optical axis, Nd represents a refractive index for a d line, and vd represents Abbe's number for the d line, respectively. Here, aspheric surfaces are indicated with surface numbers i affixed with * (asterisk).

NUMERICAL DATA EXAMPLE 1

Basic lens data are shown below.

| Unit: mm | | | | |
|---|---|---|---|---|
| Surface Data | | | | |
| Surface Number i | R | d | Nd | vd |
| (Object) | ∞ | ∞ | | |
| 1* | 45.478 | 1.8000 | 1.74330 | 49.2 (=vd1p) |
| 2 | −55.520 | 0.8000 | 1.69680 | 55.4 (=vd1n) |
| 3 | 13.137 | 1.5000 | | |
| 4 | ∞ | 7.5000 | 1.71300 | 53.9 |
| 5 | ∞ | Variable | | |
| 6* | 18.503 | 1.1500 | 1.58500 | 29.0 |
| 7* | −27.875 | 0.4600 | | |
| 8 | −5.468 | 0.5800 | 1.48749 | 70.4 |
| 9 | 14.153 | Variable | | |
| 10 (Stop) | ∞ | 0.1300 | | |
| 11* | 2.989 | 1.8400 | 1.49700 | 81.6 |
| 12 | −11.138 | 0.0600 | | |
| 13* | 6.568 | 0.6000 | 1.61420 | 26.0 |
| 14* | 3.250 | Variable | | |
| 15* | −15.306 | 0.8000 | 1.58500 | 29.0 |
| 16* | −11.984 | 0.3700 | | |
| 17 | ∞ | 0.3680 | 1.51633 | 64.1 |
| 18 | ∞ | 5.1642 | | |
| (Image Plane IM) | ∞ | | | |

| Other Data | | | |
|---|---|---|---|
| Zoom Ratio: 2.800 | | | |
| | Wide-Angle End | Mid Point | Telephoto End |
| Whole System Focal Length f | 4.749 | 8.782 | 13.295 |
| F number | 2.884 | 3.954 | 5.102 |
| Half Angle of View ω (°) | 30.07 | 17.39 | 11.69 |
| Image Height | 2.750 | 2.750 | 2.750 |
| Total Optical Track Length L | 35.137 | 35.137 | 35.137 |
| Back Focal Length BF | 5.777 | 5.777 | 5.777 |
| d5 | 1.100 | 2.960 | 1.096 |
| d9 | 8.740 | 3.133 | 1.395 |
| d14 | 2.300 | 6.047 | 9.649 | f1p = 33.891
f1n = −15.173
f3p = 4.956
f3n = −11.248
f1 = −28.944
f2 = −15.124
f3 = 6.835
fw = 4.749

Aspheric Data

First Surface k = 2.052143E+01, $A_4$ = 1.015143E−04, $A_6$ = −8.811005E−07, $A_8$ = 5.565668E−09, $A_{10}$ = 1.531546E−11

Sixth Surface k = −2.969296E+01, $A_4$ = −1.196055E−03, $A_6$ = −1.145242E−04, $A_8$ = −4.614369E−07, $A_{10}$ = 9.151571E−07, $A_{12}$ = 6.500939E−08, $A_{14}$ = −4.931845E−09

-continued

Unit: mm

Seventh Surface k = 8.591779E+01, $A_4$ = −2.298692E−03, $A_6$ = −8.216639E−05,
$A_8$ = 7.023846E−06, $A_{10}$ = 1.487953E−06
Eleventh Surface k = −7.684345E−01, $A_4$ = 1.644499E−03, $A_6$ = −1.122990E−05
Thirteenth Surface k = −2.465631, $A_4$ = −1.769724E−04, $A_6$ = −1.065986E−06,
$A_8$ = −3.277189E−06, $A_{10}$ = −4.556242E−06
Fourteenth Surface k = 8.896107E−01, $A_4$ = 2.327823E−03, $A_6$ = 4.309453E−04,
$A_8$ = −4.552548E−05, $A_{10}$ = 5.360653E−06, $A_{12}$ = 8.138525E−06,
$A_{14}$ = 9.316258E−07, $A_{16}$ = −1.176982E−06
Fifteenth Surface k = −1.942805E+02, $A_4$ = −1.715586E−03, $A_6$ = 4.349233E−04
Sixteenth Surface k = −9.732677E+01, $A_4$ = −2.453875E−03, $A_6$ = 4.255372E−04

The values of the respective conditional expressions are as follows:

|f1n/f1p|=0.448 f2/f1=0.523

|f3/f1|=0.236 f3/fw=1.439

|f3p/f3n|=0.441

|vd1n−vd1p|=6.2

Accordingly, the zoom lens of Numerical Data Example 1 satisfies the conditional expressions (1) to (6A).

Figure 2:
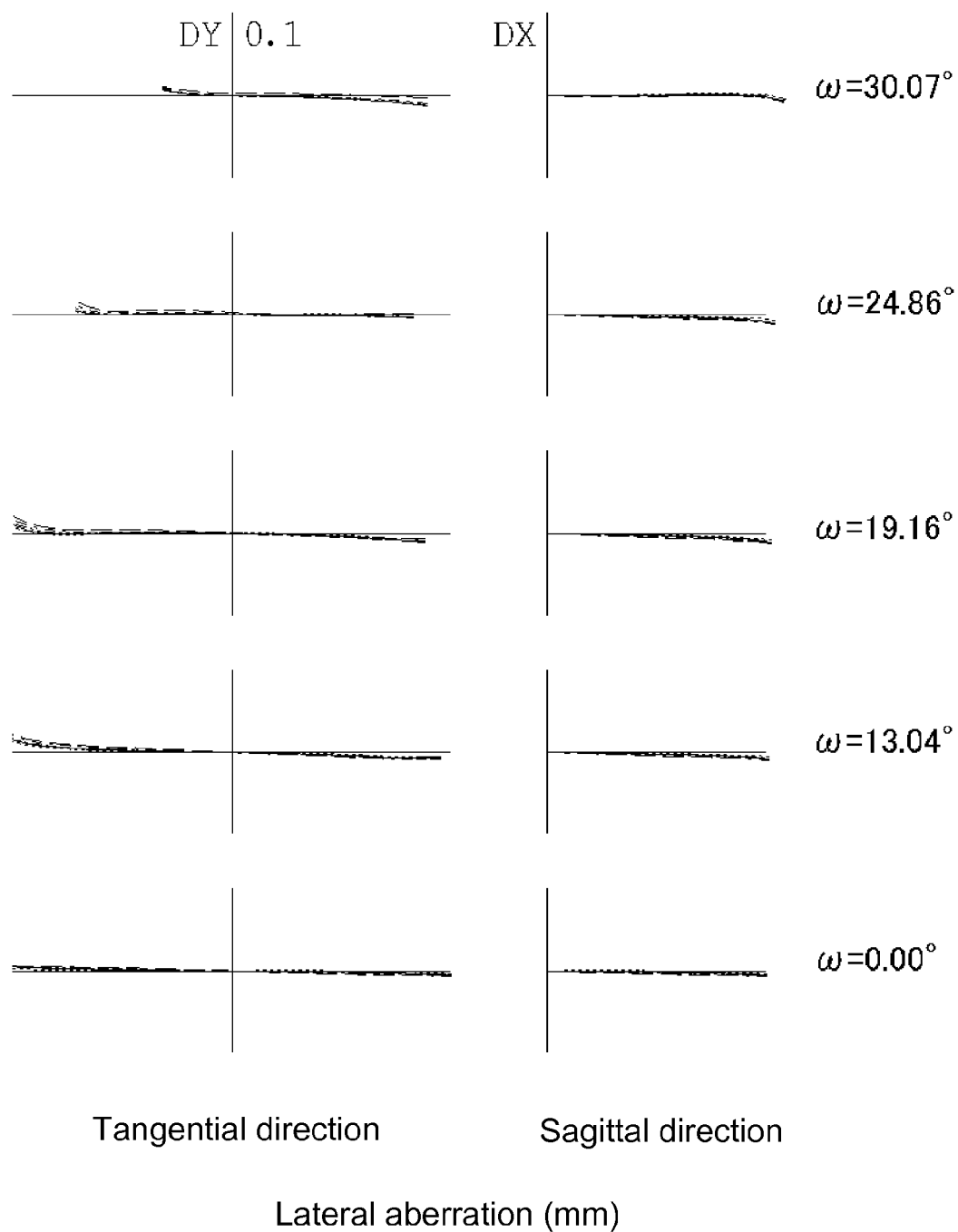
FIG. 2 is an aberration diagram showing a lateral aberration of the zoom lens of FIG. 1 at the wide-angle end.
Figure 3:
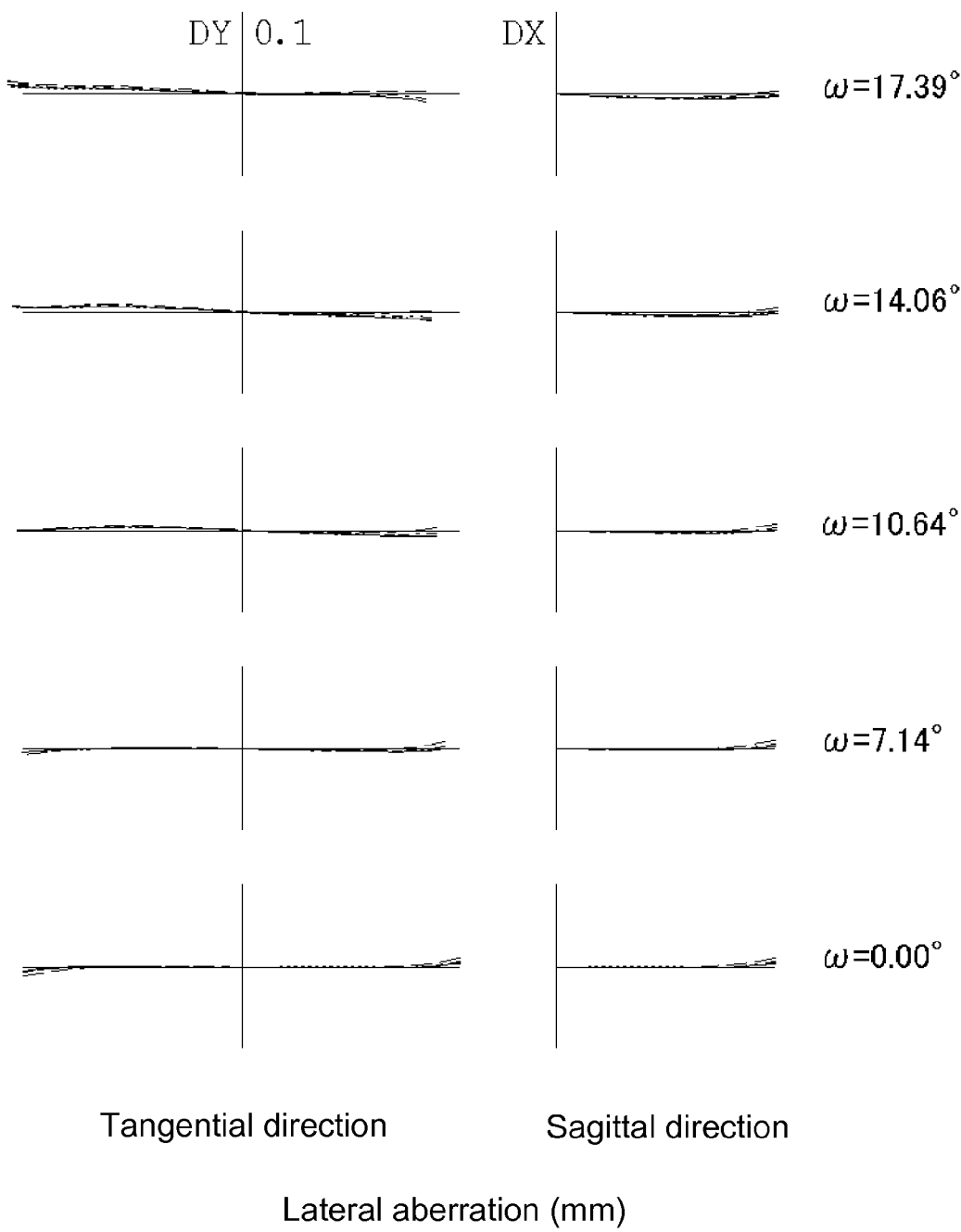
FIG. 3 is an aberration diagram showing a lateral aberration of the zoom lens of FIG. 1 at the mid point.
Figure 4:
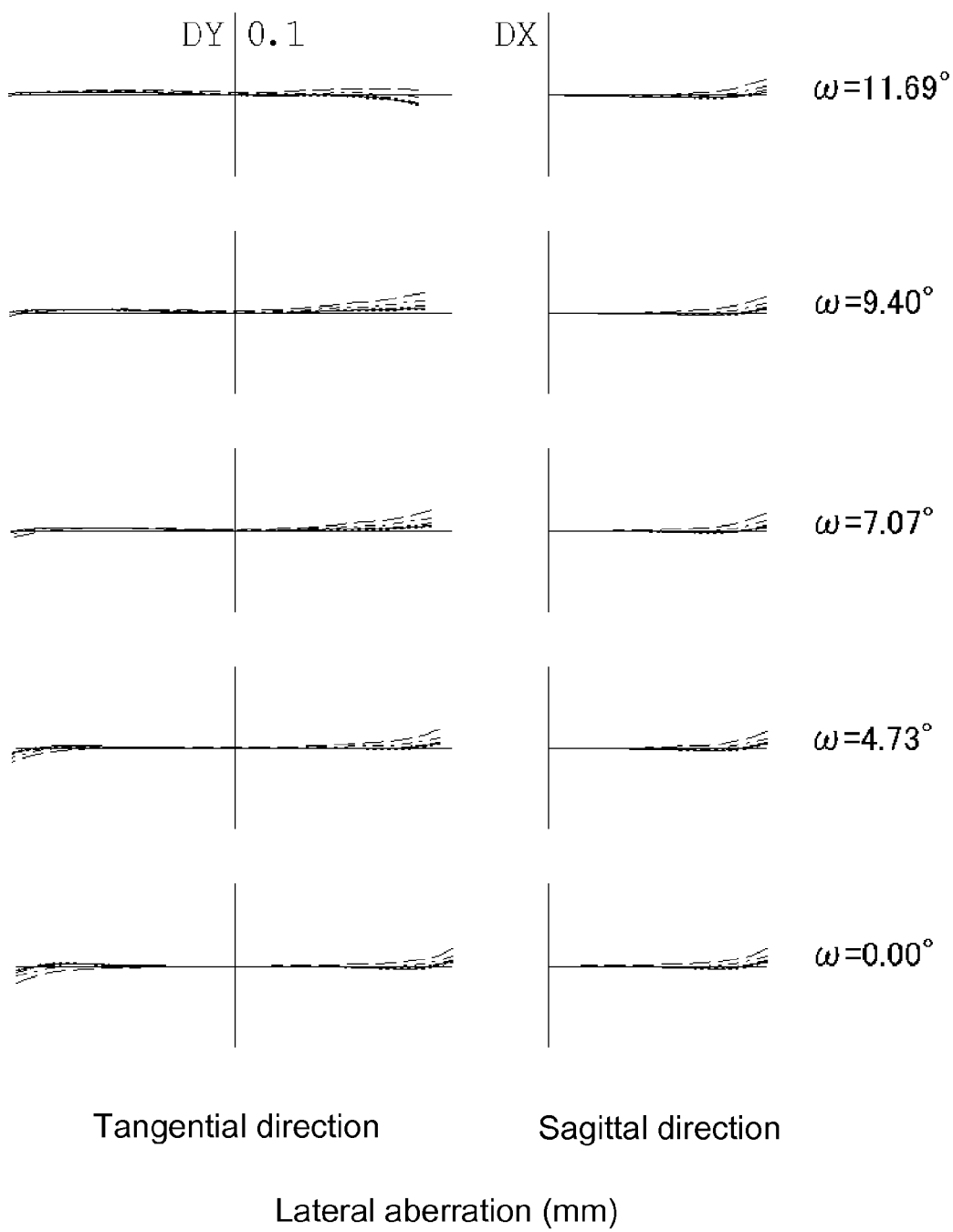
FIG. 4 is an aberration diagram showing a lateral aberration of the zoom lens of FIG. 1 at the telephoto end.

FIGS. 2 to 4 show a lateral aberration that corresponds to a half angle of view ω in the zoom lens of Numerical Data Example 1 by dividing into a tangential direction and sagittal direction (which is also the same in FIGS. 7 to 9, FIGS. 12 to 14, and FIGS. 17 to 19). Among them, FIG. 2 shows a lateral aberration at the wide-angle end (W) (which is the same in FIGS. 7, 12, and 17), FIG. 3 shows a lateral aberration at a mid point (N) (which is the same in FIGS. 8, 13, and 18), and FIG. 4 shows a lateral aberration at the telephoto end (T) (which is the same in FIGS. 9, 14, and 19).

Figure 5:
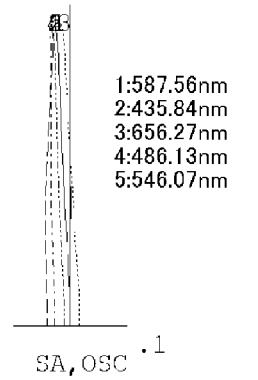
FIG. 5 is an aberration diagram showing a spherical aberration, an astigmatism, and a distortion of the zoom lens of FIG. 1.
Figure 5:
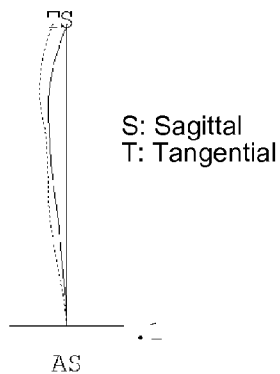
Figure 5:
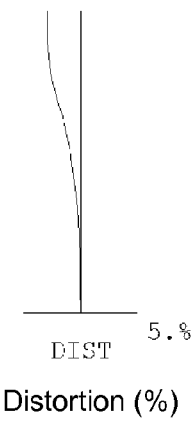
Figure 5:
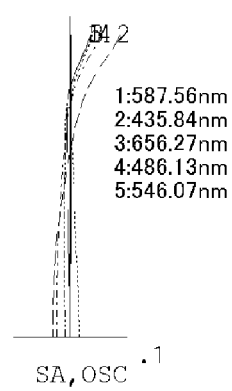
Figure 5:
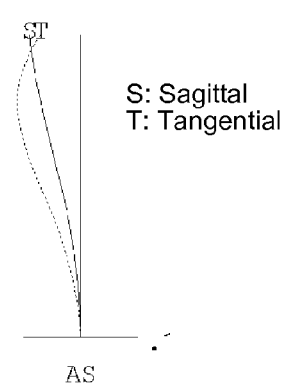
Figure 5:
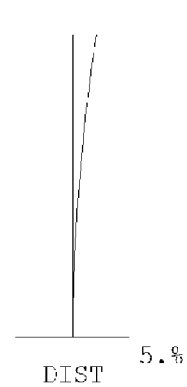
Figure 5:
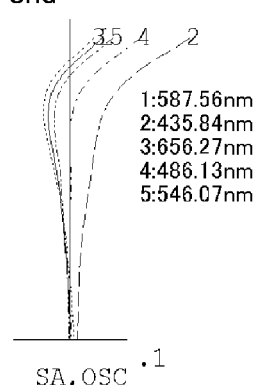
Figure 5:
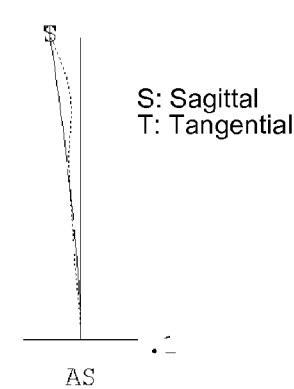
Figure 5:
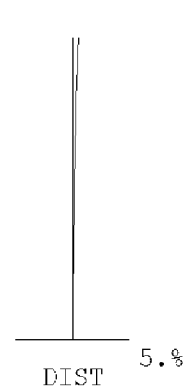
Figure 6:
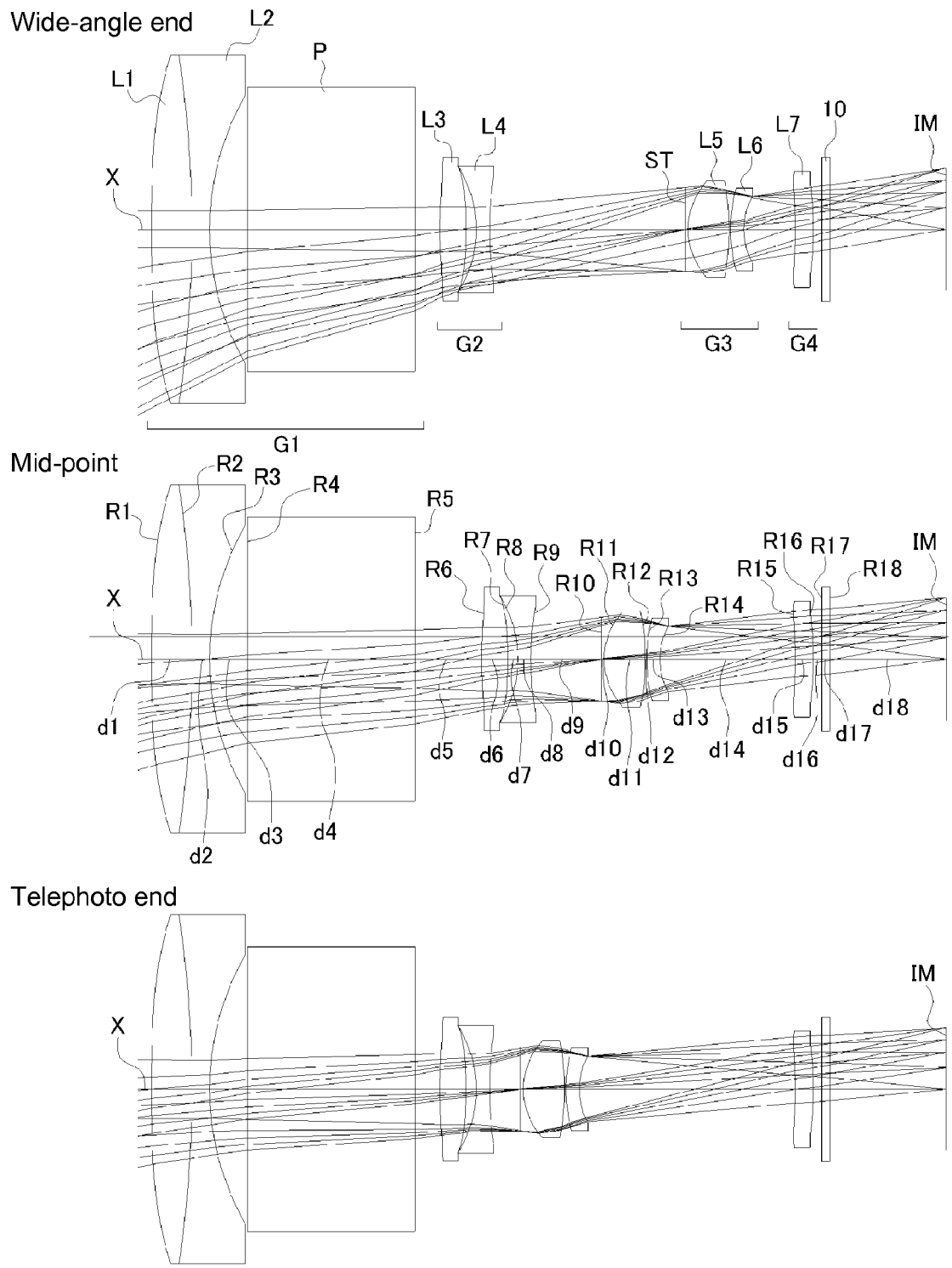
FIG. 6 shows sectional views of a zoom lens at a wide-angle end, a mid point, and a telephoto end in Numerical Data Example 2 according to the embodiment.

Furthermore, FIG. 5 shows a spherical aberration SA (mm), an astigmatism AS (mm), and a distortion DIST (%) of the zoom lens of Numerical Data Example 1, respectively. In FIG. 5, the Offence against the Sine Condition (OSC) is also indicated for the spherical aberration diagram in addition to the aberrations at the respective wavelengths of 587.56 nm, 435.84 nm, 656.27 nm, 486.13 nm, and 546.07 nm. Further, in the astigmatism diagrams, the aberration on the sagittal image surface S and the aberration on tangential image surface T are respectively indicated (which are the same in FIGS. 10, 15, and 20).

Therefore, according to the zoom lens of Numerical Data Example 1, it is possible to satisfactorily correct aberrations. Here, the respective aberration diagrams, FIGS. 2 to 5, FIGS. 7 to 10, FIGS. 12 to 15, and FIGS. 17 to 20, respectively show aberrations at object distance=infinite (∞).

NUMERICAL DATA EXAMPLE 2

Basic lens data are shown below.

Unit: mm

Surface Data

| Surface Number i | R | d | Nd | vd |
|---|---|---|---|---|
| (Object) | ∞ | ∞ | | |
| 1* | 70.280 | 1.8000 | 1.61800 | 63.4 (=vd1p) |
| 2 | −54.867 | 0.8000 | 1.51823 | 58.9 (=vd1n) |
| 3 | 12.045 | 1.7000 | | |
| 4 | ∞ | 7.5000 | 1.71300 | 53.9 |
| 5 | ∞ | Variable | | |
| 6* | 17.861 | 1.1500 | 1.58500 | 29.0 |
| 7* | −27.662 | 0.4600 | | |
| 8 | −5.367 | 0.5800 | 1.48749 | 70.4 |
| 9 | 13.458 | Variable | | |
| 10 (Stop) | ∞ | 0.1300 | | |
| 11* | 2.989 | 1.8400 | 1.49700 | 81.6 |
| 12 | −11.293 | 0.0600 | | |
| 13* | 6.530 | 0.6000 | 1.61420 | 26.0 |
| 14* | 3.251 | Variable | | |
| 15* | −15.302 | 0.8000 | 1.58500 | 29.0 |
| 16* | −12.077 | 0.3700 | | |
| 17 | ∞ | 0.3680 | 1.51633 | 64.1 |
| 18 | ∞ | 5.1818 | | |
| (Image Plane IM) | ∞ | | | |

Other Data
Zoom Ratio: 2.798

| | Wide-Angle End | Mid Point | Telephoto End |
|---|---|---|---|
| Whole System Focal Length f | 4.800 | 8.915 | 13.429 |
| F number | 2.895 | 3.976 | 5.120 |
| Half Angle of View ω (°) | 29.81 | 17.14 | 11.57 |
| Image Height | 2.750 | 2.750 | 2.750 |
| Total Optical Track Length L | 35.354 | 35.354 | 35.354 |
| Back Focal Length BF | 5.794 | 5.794 | 5.794 |
| d5 | 1.100 | 2.960 | 1.096 |
| d9 | 8.740 | 3.133 | 1.395 |
| d14 | 2.300 | 6.047 | 9.649 | f1p = 50.133
f1n = −18.981
f3p = 4.968
f3n = −11.330
f1 = −31.477
f2 = −14.710
f3 = 6.837
fw = 4.800

Aspheric Data

First Surface k = 2.714798E+01, $A_4$ = 1.248390E−04, $A_6$ = −7.767869E−07,
$A_8$ = 4.496668E−09, $A_{10}$ = 4.070339E−11
Sixth Surface k = −2.661163E+01, $A_4$ = −1.129382E−03, $A_6$ = −1.096657E−04,
$A_8$ = −6.526982E−07, $A_{10}$ = 8.896087E−07, $A_{12}$ = 6.390252E−08,
$A_{14}$ = −4.842119E−09
Seventh Surface k = 8.633918E+01, $A_4$ = −2.319369E−03, $A_6$ = −8.553969E−05,
$A_8$ = 7.114406E−06, $A_{10}$ = 1.484657E−06
Eleventh Surface k = −7.647182E−01, $A_4$ = 1.669716E−03, $A_6$ = −1.685006E−05

-continued

Unit: mm

Thirteenth Surface k = −2.390824, $A_4$ = −1.466771E−04, $A_6$ = 7.441145E−06,
$A_8$ = −3.835669E−06, $A_{10}$ = −4.478852E−06
Fourteenth Surface k = 8.981109E−01, $A_4$ = 2.403249E−03, $A_6$ = 4.322386E−04,
$A_8$ = −3.835845E−05, $A_{10}$ = 8.110285E−06, $A_{12}$ = 8.081794E−06,
$A_{14}$ = 5.119148E−07, $A_{16}$ = −1.305499E−06
Fifteenth Surface k = −1.939775E+02, $A_4$ = −1.544973E−03, $A_6$ = 4.456419E−04
Sixteenth Surface k = −9.744186E+01, $A_4$ = −2.345827E−03, $A_6$ = 4.366303E−04

The values of the respective conditional expressions are as follows:

$|f1n/f1p|$=0.379

$f2/f1$=0.467

$|f3/f1|$=0.217

$f3/fw$=1.424

$|f3p/f3n|$=0.438

$|vd1n−vd1p|$=4.5

Accordingly, the zoom lens of Numerical Data Example 2 satisfies the conditional expressions (1) to (6A).

Figure 7:
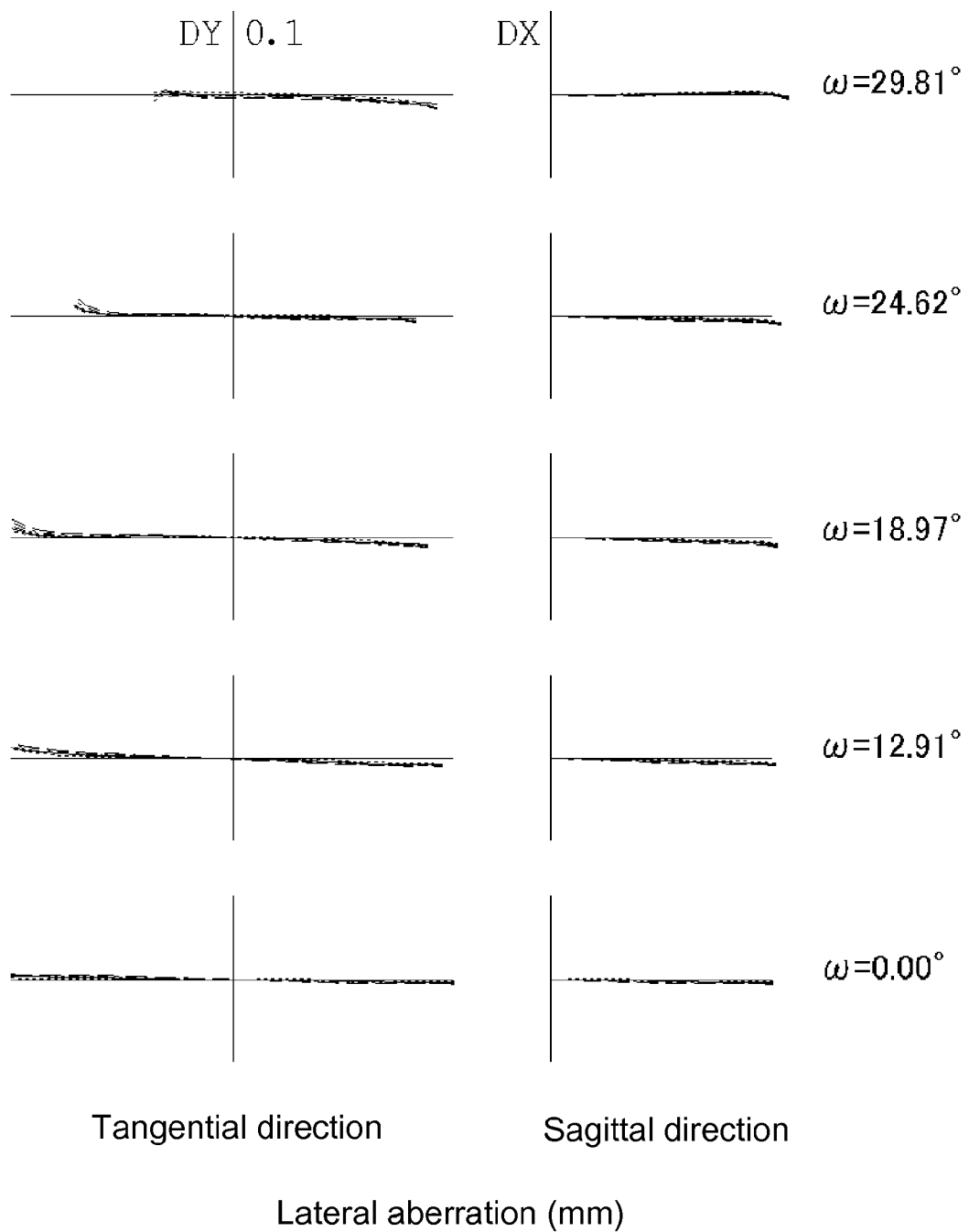
FIG. 7 is an aberration diagram showing a lateral aberration of the zoom lens of FIG. 6 at the wide-angle end.
Figure 8:
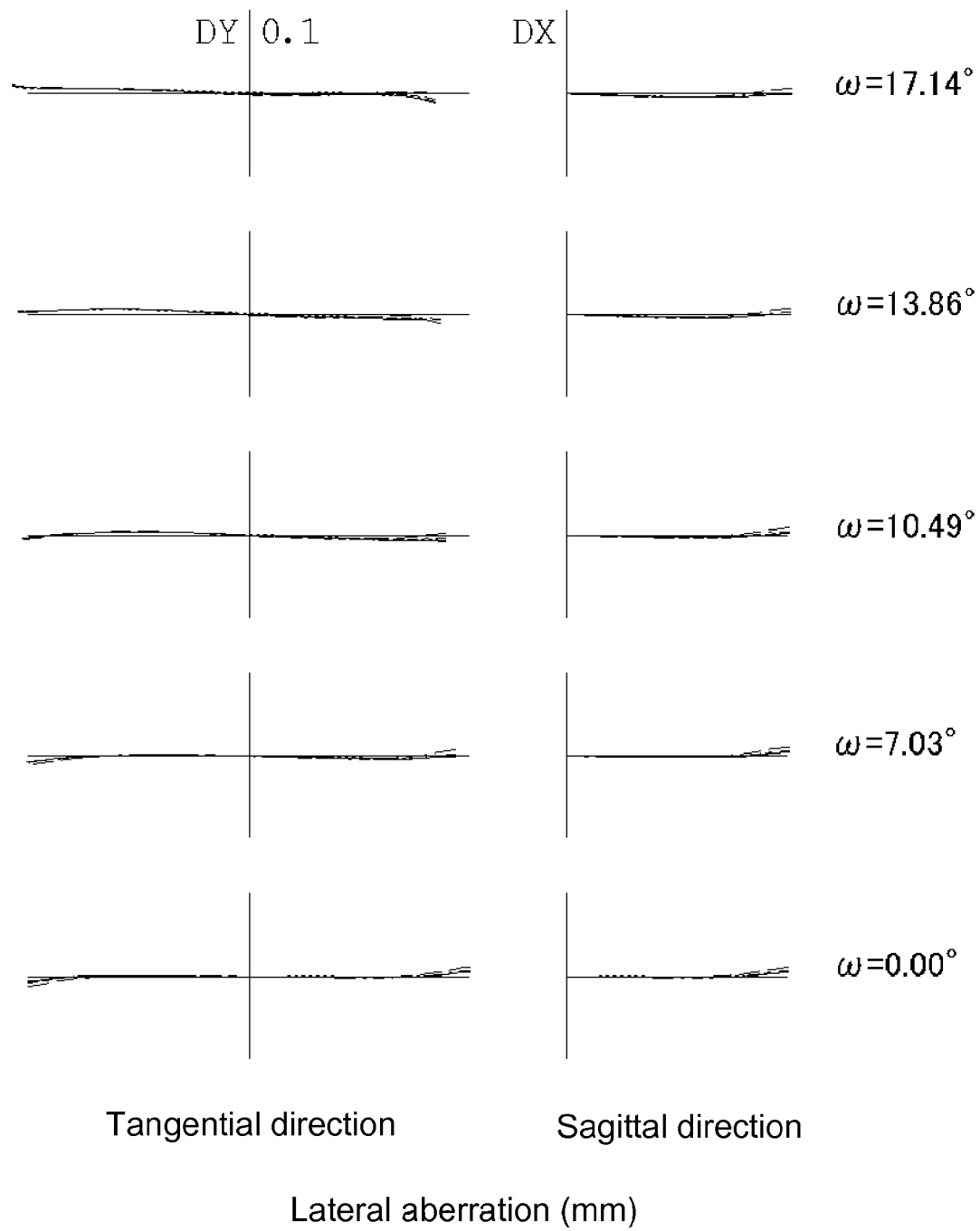
FIG. 8 is an aberration diagram showing a lateral aberration of the zoom lens of FIG. 6 at the mid point.
Figure 9:
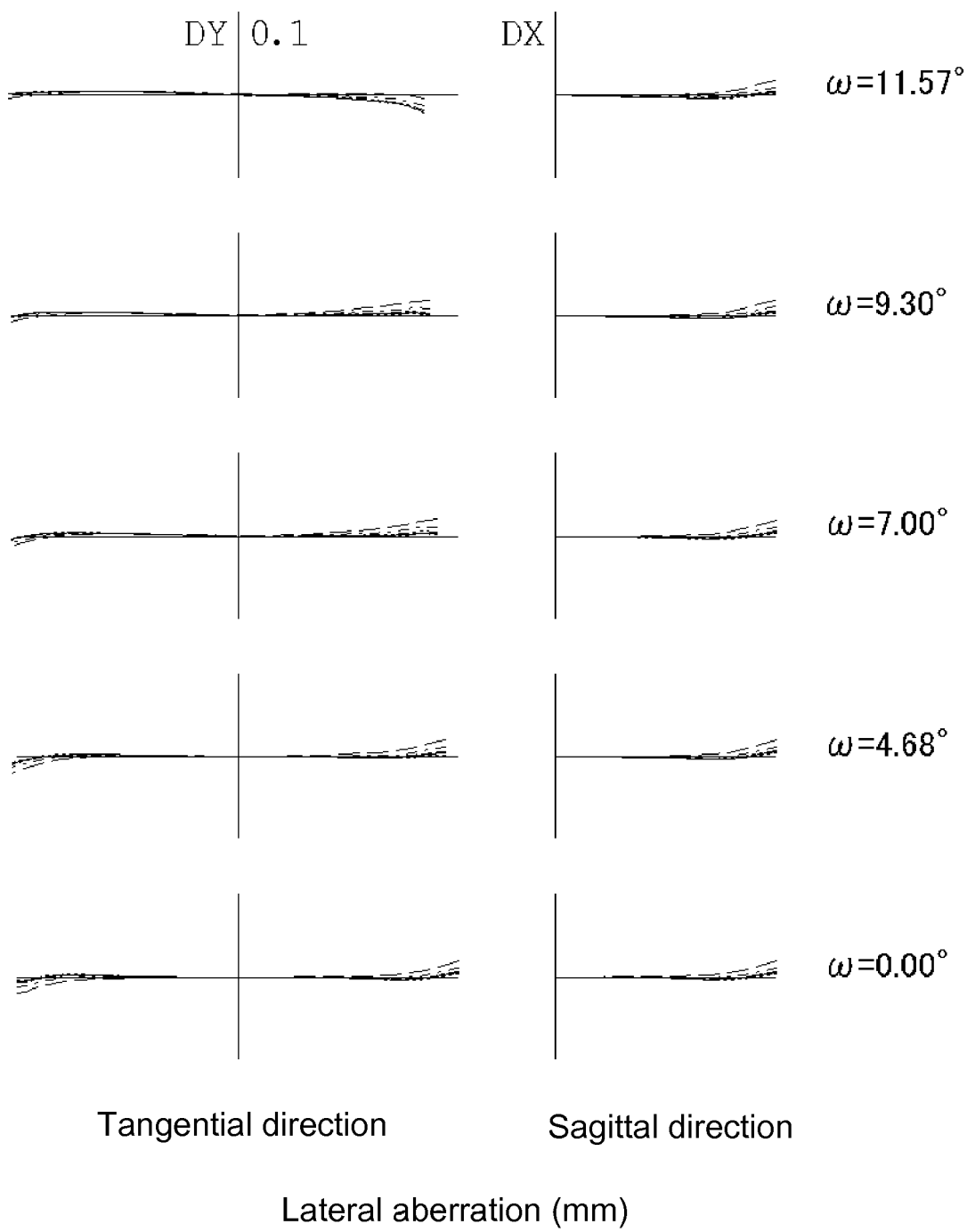
FIG. 9 is an aberration diagram showing a lateral aberration of the zoom lens of FIG. 6 at the telephoto end.
Figure 10:
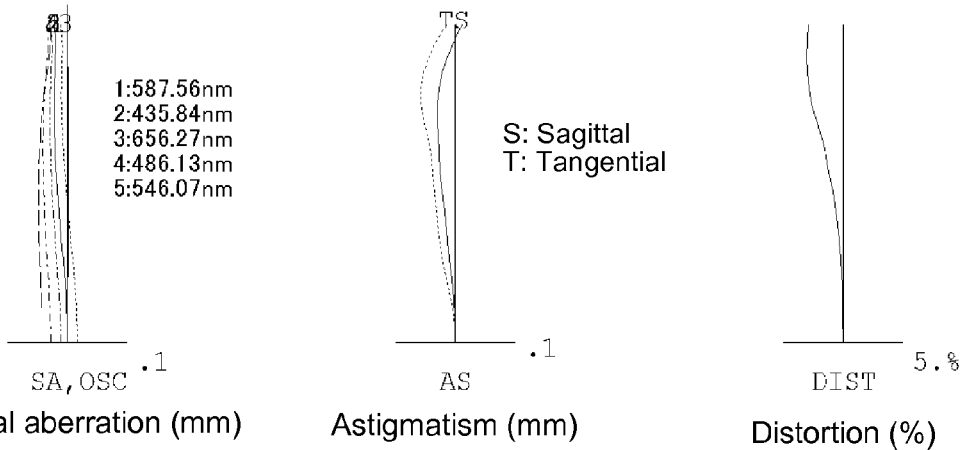
FIG. 10 is an aberration diagram showing a spherical aberration, an astigmatism, and a distortion of the zoom lens of FIG. 6.
Figure 10:
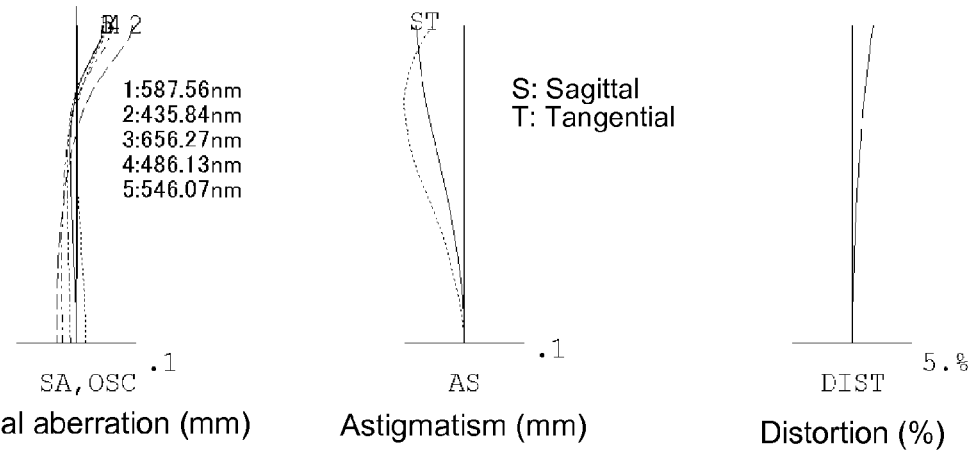
Figure 10:
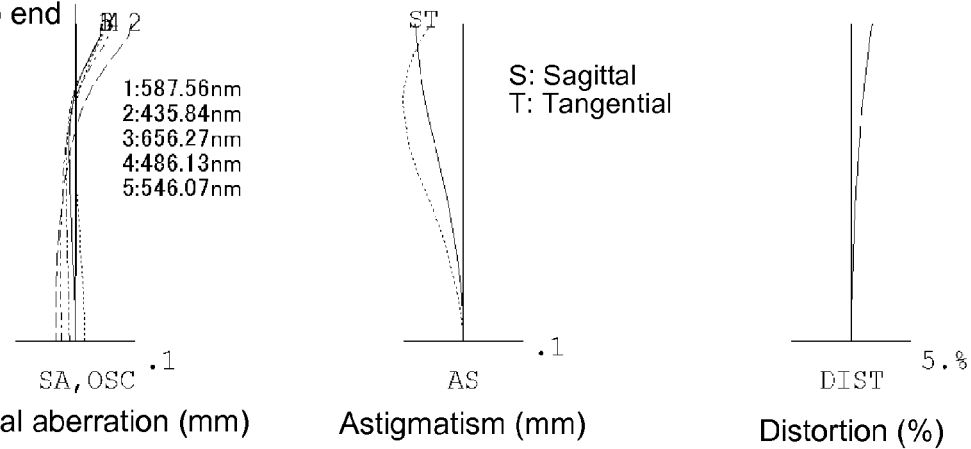
Figure 11:
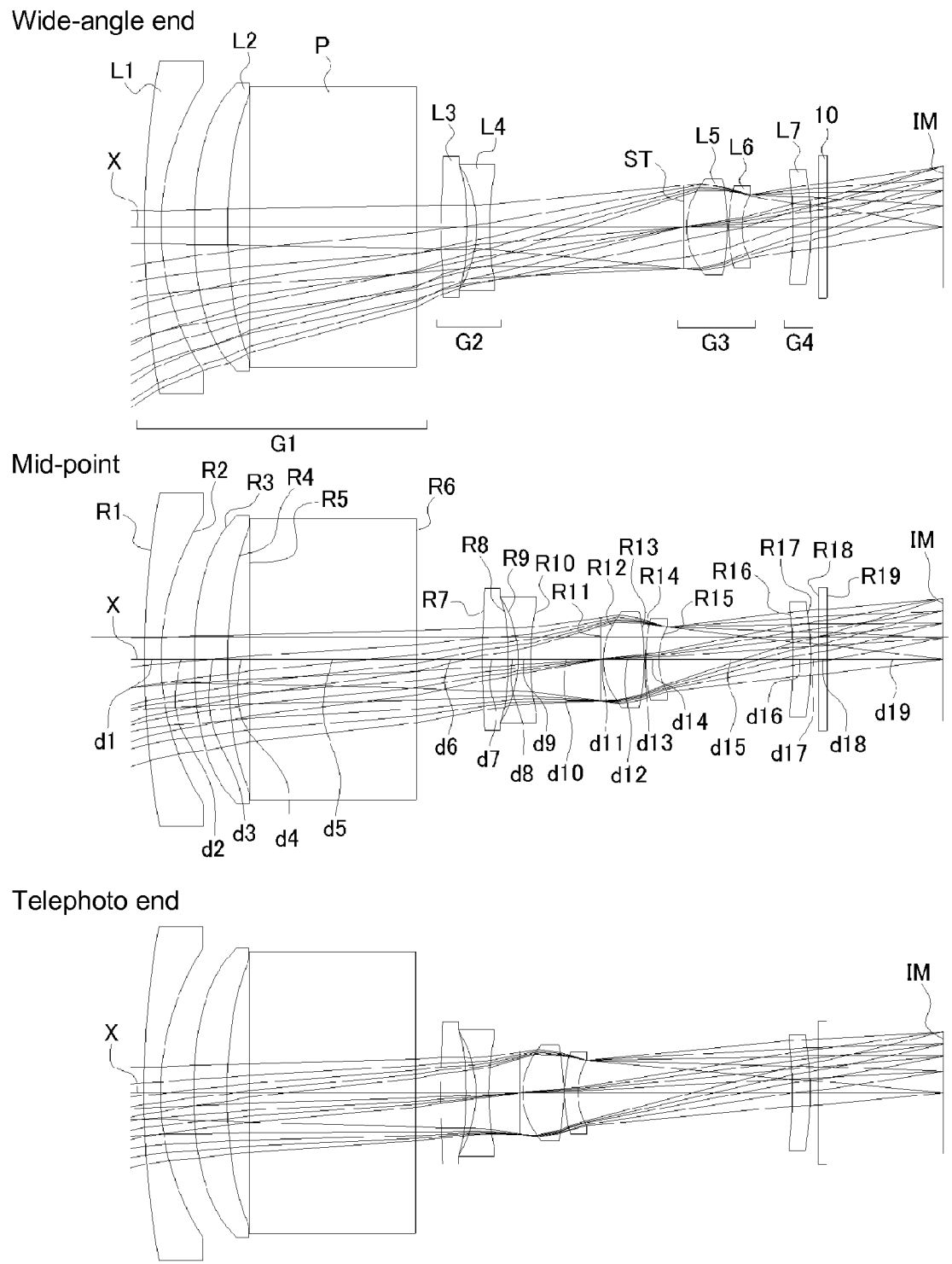
FIG. 11 shows sectional views of a zoom lens at a wide-angle end, a mid point, and a telephoto end in Numerical Data Example 3 according to the embodiment.

FIGS. 7 to 9 show lateral aberrations that correspond to the half angle of view ω in the zoom lens of Numerical Data Example 2. FIG. 10 shows the spherical aberration SA (mm), the astigmatism AS (mm), and the distortion DIST (%), respectively. Therefore, even with the zoom lens of Numerical Data Example 2, it is possible to satisfactorily correct image surface and satisfactorily correct aberrations.

NUMERICAL DATA EXAMPLE 3

According to the zoom lens of Numerical Data Example 3, the first lens group G1 includes a first lens L1 having negative refractive power, a second lens L2 having positive refractive power, and a prism P, arranged in the order from the object side. The first lens L1 and the second lens L2 are respectively formed in a shape of a meniscus lens directing a convex surface thereof to the object side near the optical axis X (which will be the same in Numerical Data Example 4 that will be described later). With such shapes of the first lens L1 and the second lens L2, it is possible to suitably attain miniaturization of the zoom lens.

Basic lens data are shown below.

Unit: mm

Surface Data

| Surface Number i | R | d | Nd | vd |
|---|---|---|---|---|
| (Object) | ∞ | ∞ | | |
| 1 | 41.675 | 0.7500 | 1.77250 | 49.6 (=vd1n) |
| 2 | 12.107 | 1.5000 | | |
| 3* | 20.834 | 1.5000 | 1.58500 | 29.0 (=vd1p) |
| 4* | 24.481 | 1.0000 | | |
| 5 | ∞ | 7.5000 | 1.71300 | 53.9 |
| 6 | ∞ | Variable | | |
| 7* | 16.655 | 1.1500 | 1.58500 | 29.0 |
| 8* | −28.017 | 0.4600 | | |
| 9 | −5.502 | 0.5800 | 1.48749 | 70.4 |
| 10 | 13.338 | Variable | | |
| 11 (Stop) | ∞ | 0.1300 | | |
| 12* | 2.990 | 1.8400 | 1.49700 | 81.6 |
| 13 | −10.902 | 0.0600 | | |
| 14* | 6.639 | 0.6000 | 1.61420 | 26.0 |
| 15* | 3.257 | Variable | | |
| 16* | −17.525 | 0.8000 | 1.58500 | 29.0 |
| 17* | −14.426 | 0.3700 | | |
| 18 | ∞ | 0.3680 | 1.51633 | 64.1 |
| 19 | ∞ | 5.2427 | | |
| (Image Plane IM) | ∞ | | | |

Other Data
Zoom Ratio: 2.803

| | Wide-Angle End | Mid Point | Telephoto End |
|---|---|---|---|
| Whole System Focal Length f | 4.399 | 8.103 | 12.331 |
| F number | 2.942 | 4.031 | 5.211 |
| Half Angle of View ω (°) | 32.01 | 18.75 | 12.57 |
| Image Height | 2.750 | 2.750 | 2.750 |
| Total Optical Track Length L | 35.865 | 35.865 | 35.865 |
| Back Focal Length BF | 5.855 | 5.855 | 5.855 |
| d6 | 1.100 | 2.960 | 1.096 |
| d10 | 8.740 | 3.133 | 1.395 |
| d15 | 2.300 | 6.047 | 9.649 | f1p = 207.554
f1n = −22.337
f3p = 4.938
f3n = −11.163
f1 = −24.583
f2 = −15.698
f3 = 6.826
fw = 4.399

Aspheric Data

Third Surface k = 3.509335, $A_4$ = 2.755611E−04, $A_6$ = 1.460797E−06,
$A_8$ = −1.054260E−08, $A_{10}$ = 1.267022E−09
Fourth Surface k = −9.452414E−02, $A_4$ = 1.216176E−04, $A_6$ = 1.787719E−06
Seventh Surface k = −3.669898E+01, $A_4$ = −1.128726E−03, $A_6$ = −1.129927E−04,
$A_8$ = −2.250614E−06, $A_{10}$ = 8.683077E−07, $A_{12}$ = 7.197789E−08,
$A_{14}$ = −3.320164E−09
Eighth Surface k = 8.446368E+01, $A_4$ = −2.561455E−03, $A_6$ = −6.782921E−05,
$A_8$ = 7.884073E−06, $A_{10}$ = 1.483586E−06
Twelfth Surface k = −7.591143E−01, $A_4$ = 1.692338E−03, $A_6$ = −9.205934E−06
Fourteenth Surface k = −2.273233, $A_4$ = −1.141013E−04, $A_6$ = −2.773267E−05,
$A_8$ = −1.349021E−05, $A_{10}$ = −1.719046E−06
Fifteenth Surface k = 9.138825E−01, $A_4$ = 2.570563E−03, $A_6$ = 3.998257E−04,
$A_8$ = −8.989558E−06, $A_{10}$ = 1.032031E−05, $A_{12}$ = 4.901501E−06,
$A_{14}$ = −5.200339E−07, $A_{16}$ = −6.488491E−07

-continued

Unit: mm

Sixteenth Surface $k = -1.419108E+02, A_4 = -2.588241E-03, A_6 = 3.250682E-04$
Seventeenth Surface $k = -8.401693E+01, A_4 = -2.987940E-03, A_6 = 2.571922E-04$ The values of the respective conditional expressions are as follows:

$|f1n/f1p| = 0.108$ $f2/f1 = 0.639$ $|f3/f1| = 0.278$ $f3/fw = 1.552$ $|f3p/f3n| = 0.442$ $|vd1n - vd1p| = 20.6$

Accordingly, the zoom lens of Numerical Data Example 3 satisfies the conditional expressions (1) to (6).

Figure 12:
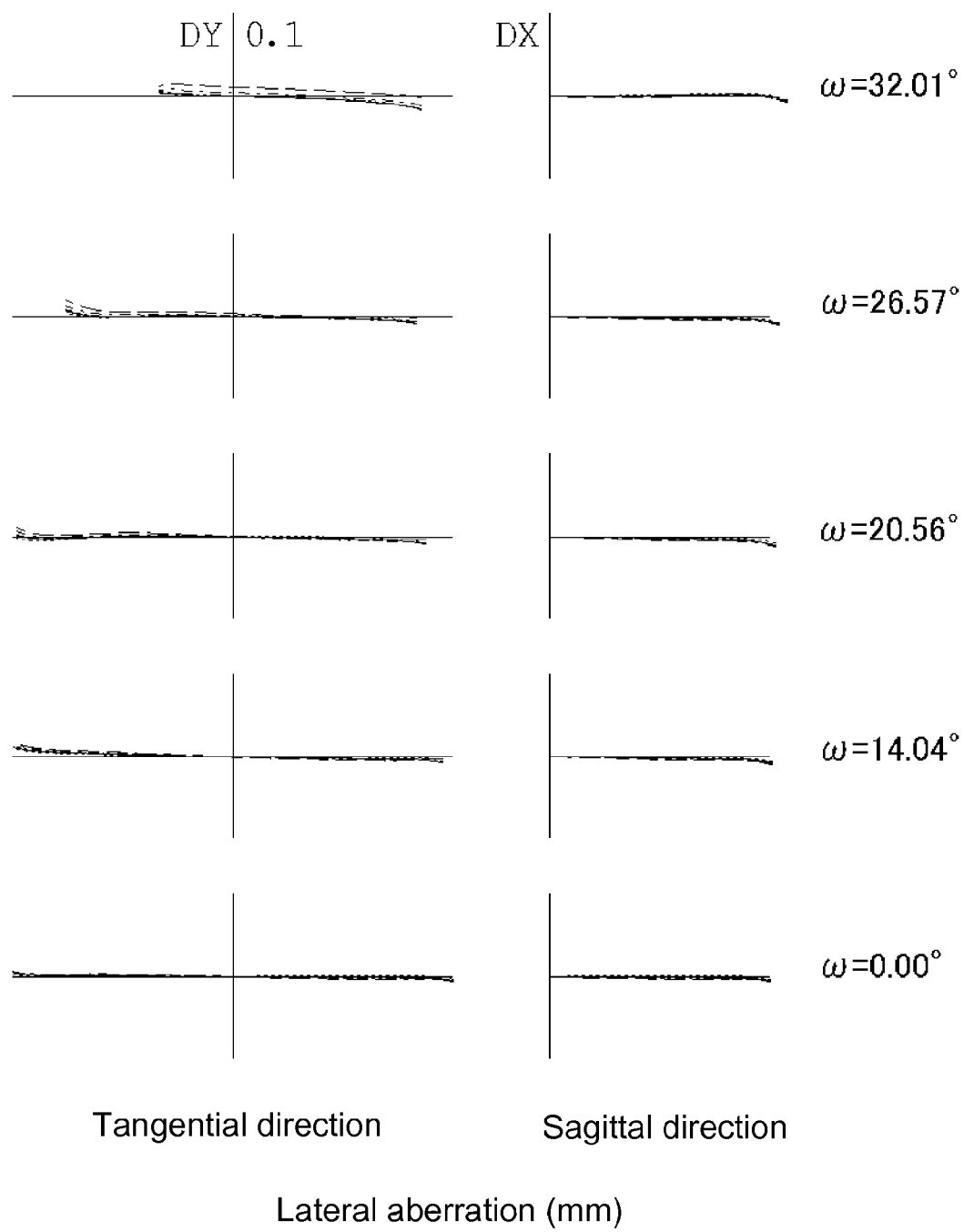
FIG. 12 is an aberration diagram showing a lateral aberration of the zoom lens of FIG. 11 at the wide-angle end.
Figure 13:
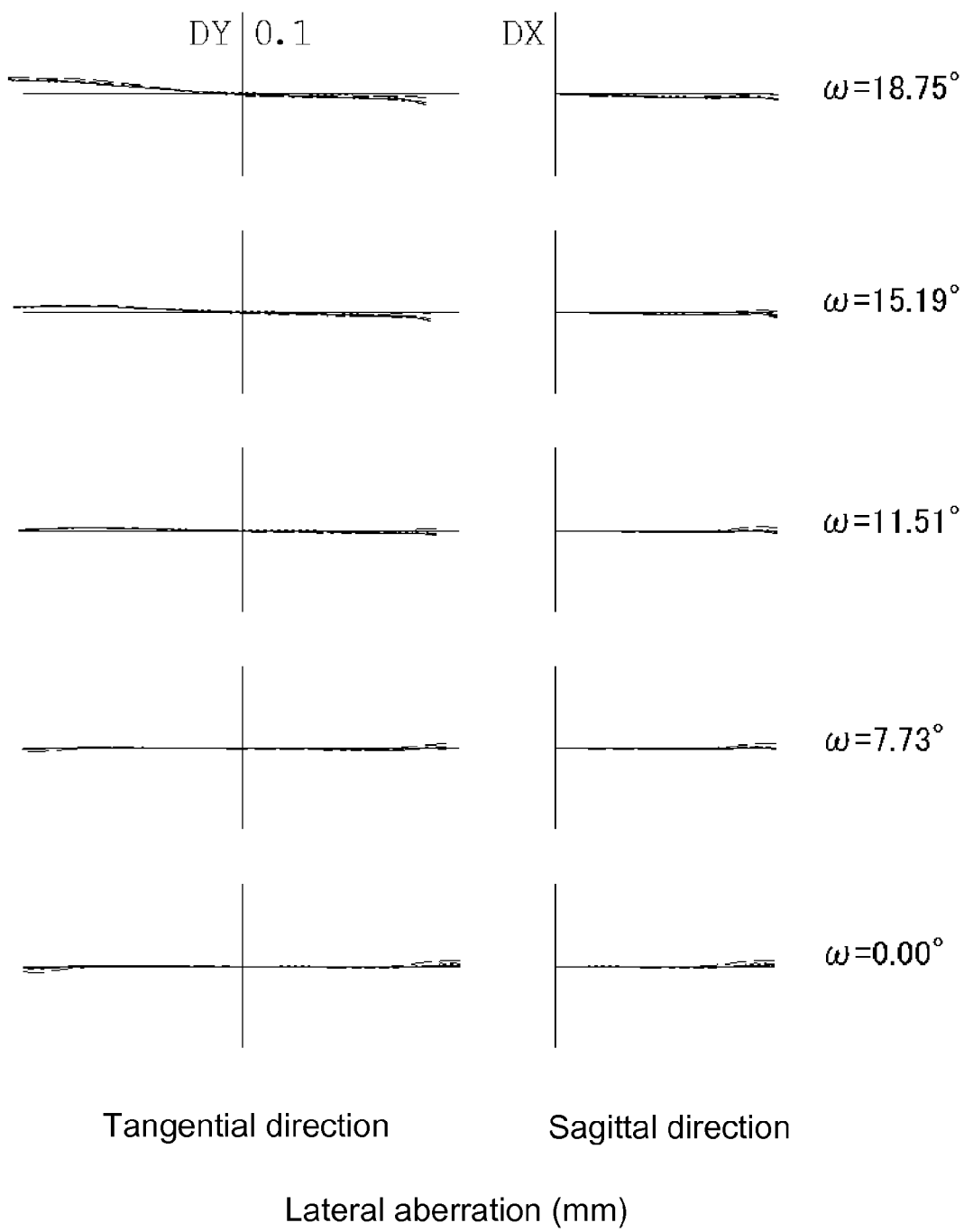
FIG. 13 is an aberration diagram showing a lateral aberration of the zoom lens of FIG. 11 at the mid point.
Figure 14:
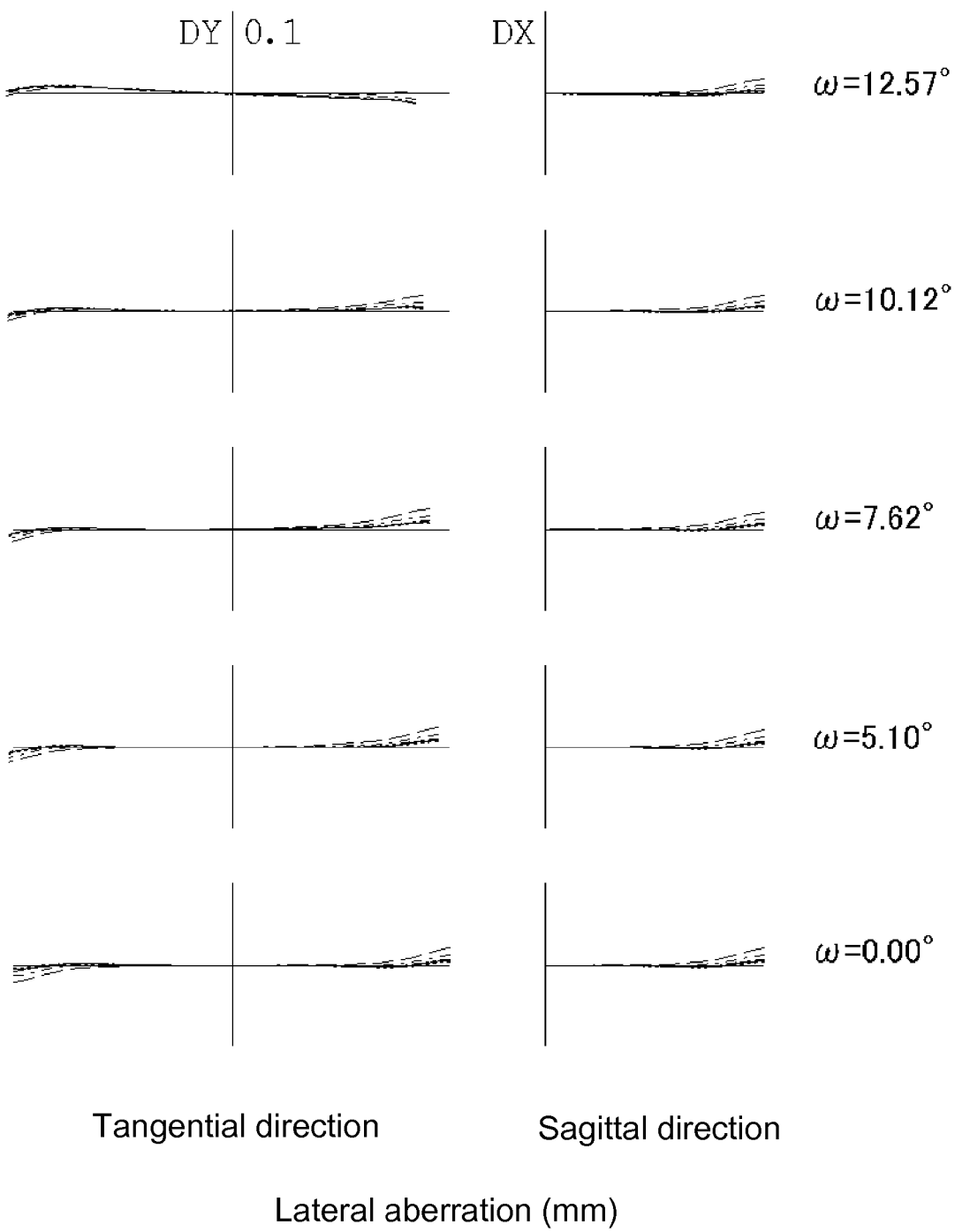
FIG. 14 is an aberration diagram showing a lateral aberration of the zoom lens of FIG. 11 at the telephoto end.
Figure 15:
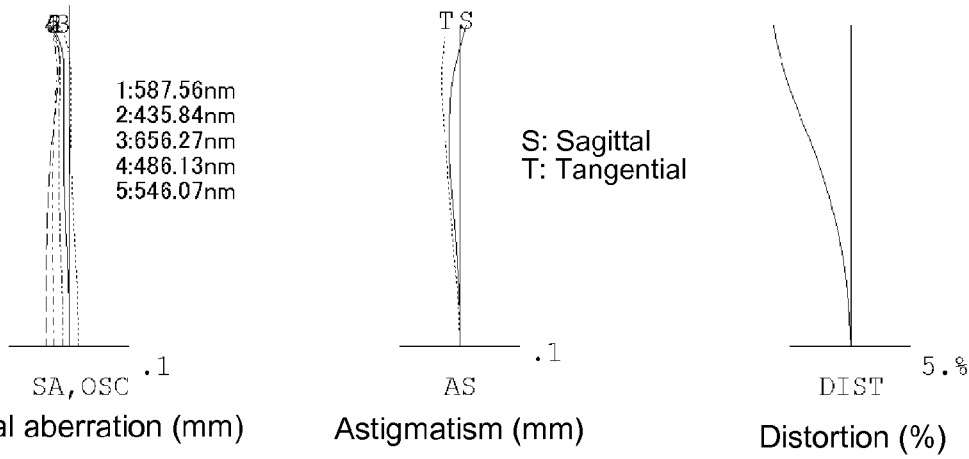
FIG. 15 is an aberration diagram showing a spherical aberration, an astigmatism, and a distortion of the zoom lens of FIG. 11.
Figure 15:
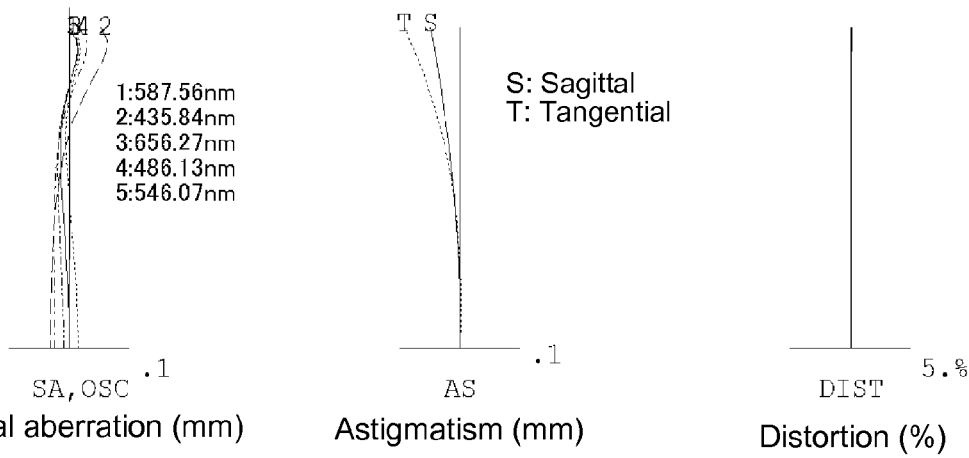
Figure 15:
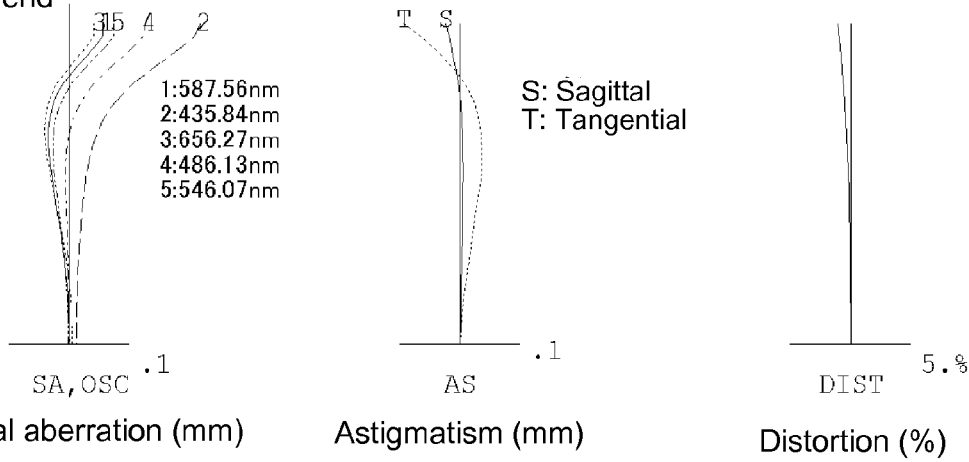
Figure 16:
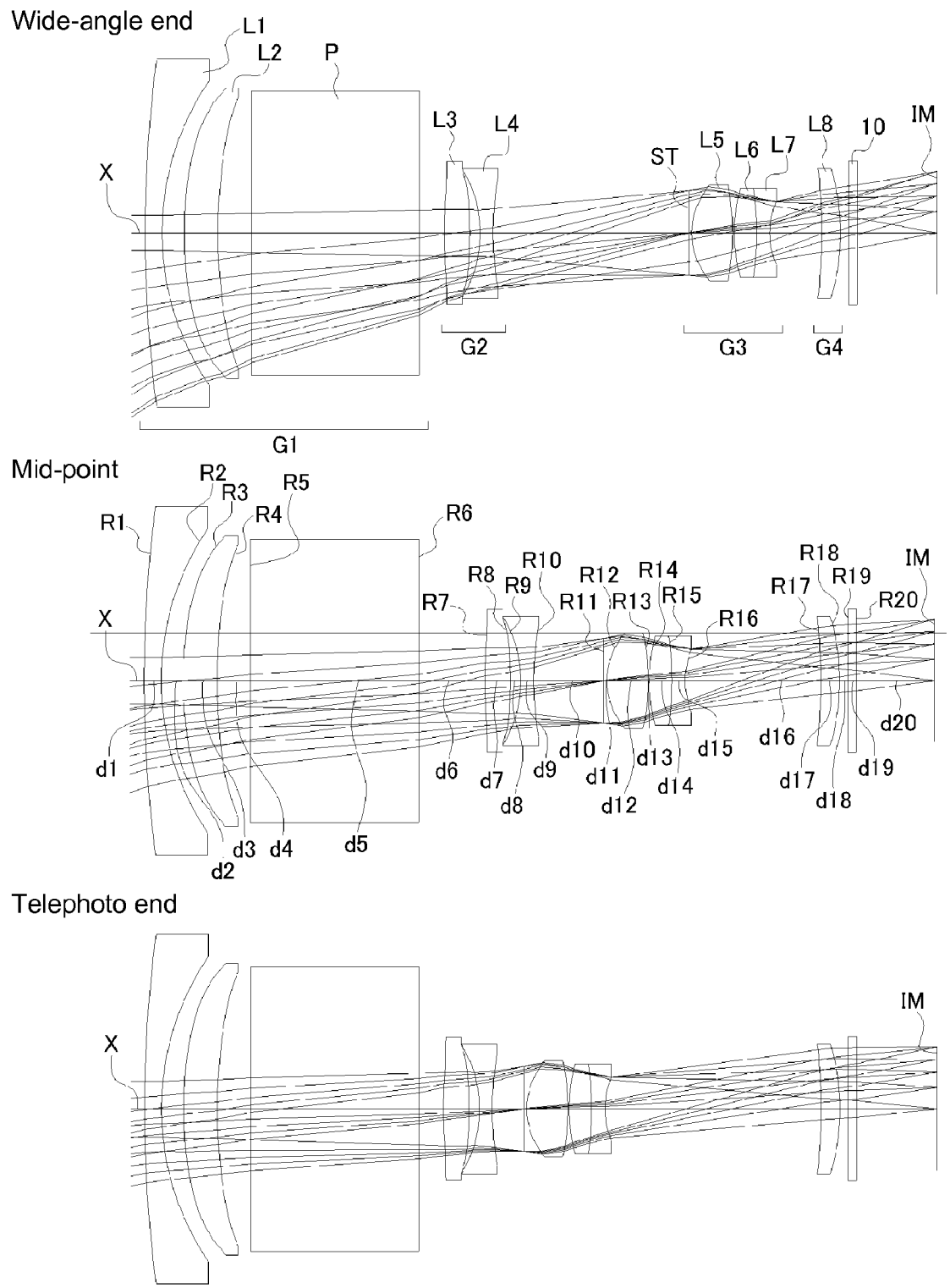
FIG. 16 shows sectional views of a zoom lens at a wide-angle end, a mid point, and a telephoto end in Numerical Data Example 4 according to the embodiment.

FIGS. 12 to 14 show lateral aberrations that correspond to the half angle of view ω in the zoom lens of Numerical Data Example 3. FIG. 15 shows the spherical aberration SA (mm), the astigmatism AS (mm), and the distortion DIST (%), respectively. Therefore, even with the zoom lens of Numerical Data Example 3, it is possible to satisfactorily correct image surface and satisfactorily correct aberrations.

NUMERICAL DATA EXAMPLE 4

According to the zoom lens of Numerical Data Example 4, the third lens group G3 includes a stop ST, a fifth lens L5 having positive refractive power, a sixth lens L6 having positive refractive power, and a seventh lens L7 having negative refractive power, arranged in the order from the object side. Among them, the sixth lens L6 and the seventh lens L7 are bonded to each other to form a bonded lens. With such configuration of the third lens group G3, it is possible to more satisfactorily correct chromatic aberration with the bonded lens composed of the sixth lens L6 and the seventh lens L7.

Basic lens data are shown below.

Unit: mm

Surface Data

| Surface Number i | R | d | Nd | vd |
|---|---|---|---|---|
| (Object) | ∞ | ∞ | | |
| 1 | 61.303 | 0.7500 | 1.72000 | 50.3 (=vd1n) |
| 2 | 12.139 | 1.0000 | | |
| 3* | 20.912 | 1.5000 | 1.62004 | 36.3 (=vd1p) |
| 4* | 28.372 | 1.5000 | | |
| 5 | ∞ | 7.5000 | 1.71300 | 53.9 |
| 6 | ∞ | Variable | | |
| 7* | 15.778 | 1.1500 | 1.58500 | 29.0 |
| 8* | −28.227 | 0.4600 | | |
| 9 | −5.584 | 0.5800 | 1.48749 | 70.4 |
| 10 | 14.827 | Variable | | |
| 11 (Stop) | ∞ | 0.1300 | | |
| 12* | 3.056 | 1.8400 | 1.49700 | 81.6 |
| 13* | −10.787 | 0.0600 | | |
| 14* | 6.798 | 1.0000 | 1.61800 | 63.4 |
| 15 | −14.204 | 0.6000 | 1.83400 | 37.3 |
| 16* | 3.969 | Variable | | |
| 17 | −27.497 | 0.8500 | 1.58500 | 29.0 |
| 18* | −11.087 | 0.3700 | | |
| 19 | ∞ | 0.3680 | 1.51633 | 64.1 |
| 20 | ∞ | 3.5743 | | |
| (Image Plane IM) | ∞ | | | |

Other Data
Zoom Ratio: 2.854

| | Wide-Angle End | Mid Point | Telephoto End |
|---|---|---|---|
| Whole System Focal Length f | 4.300 | 8.000 | 12.273 |
| F number | 2.721 | 3.829 | 4.937 |
| Half Angle of View ω (°) | 32.60 | 18.97 | 12.63 |
| Image Height | 2.750 | 2.750 | 2.750 |
| Total Optical Track Length L | 35.247 | 35.247 | 35.247 |
| Back Focal Length BF | 4.187 | 4.187 | 4.187 |
| d6 | 1.100 | 2.960 | 1.096 |
| d10 | 8.740 | 3.133 | 1.395 |
| d16 | 2.300 | 6.047 | 9.649 | f1p = 119.105
f1n = −21.158
f3p = 5.013
f3n = −8.583
f1 = −25.335
f2 = −17.586
f3 = 6.698
fw = 4.300

Aspheric Data

Third Surface $k = 3.264297, A_4 = 2.988993E-04, A_6 = 9.851433E-07,$
$A_8 = -1.952113E-08, A_{10} = 1.297080E-09$
Fourth Surface $k = -9.452414E-02, A_4 = 1.216176E-04, A_6 = 1.787719E-06$
Seventh Surface $k = -3.401524E+01, A_4 = -1.158674E-03, A_6 = -1.159193E-04,$
$A_8 = -2.525073E-06, A_{10} = 8.456085E-07, A_{12} = 7.028339E-08,$
$A_{14} = -3.470701E-09$
Eighth Surface $k = 8.318965E+01, A_4 = -2.596123E-03, A_6 = -7.588712E-05,$
$A_8 = 7.099053E-06, A_{10} = 1.419990E-06$
Twelfth Surface $k = -8.779749E-01, A_4 = 2.043080E-03, A_6 = 7.878284E-06$
Thirteenth Surface $k = -2.724983, A_4 = -3.644963E-04, A_6 = -6.892097E-05$
Fourteenth Surface $k = -3.041445, A_4 = -3.942873E-04, A_6 = -6.020295E-05,$
$A_8 = -1.537556E-05, A_{10} = -3.842226E-06$
Sixteenth Surface $k = 1.194753, A_4 = 3.344424E-03, A_6 = 8.763346E-04, A_8 = 4.251334E-05, A_{10} = -3.705970E-06, A_{12} = -4.656010E-06,$
$A_{14} = -1.740505E-06, A_{16} = 1.953234E-06$
Eighteenth Surface $k = -2.499241E-01, A_4 = -5.758253E-04, A_6 = -2.173904E-05$ The values of the respective conditional expressions are as follows:

$|f1n/f1p|=0.178$ $f2/f1=0.694$ $|f3/f1|=0.264$ $f3/fw=1.558$ $|f3p/f3n|=0.584$ $|vd1n-vd1p|=14.0$

Figure 17:
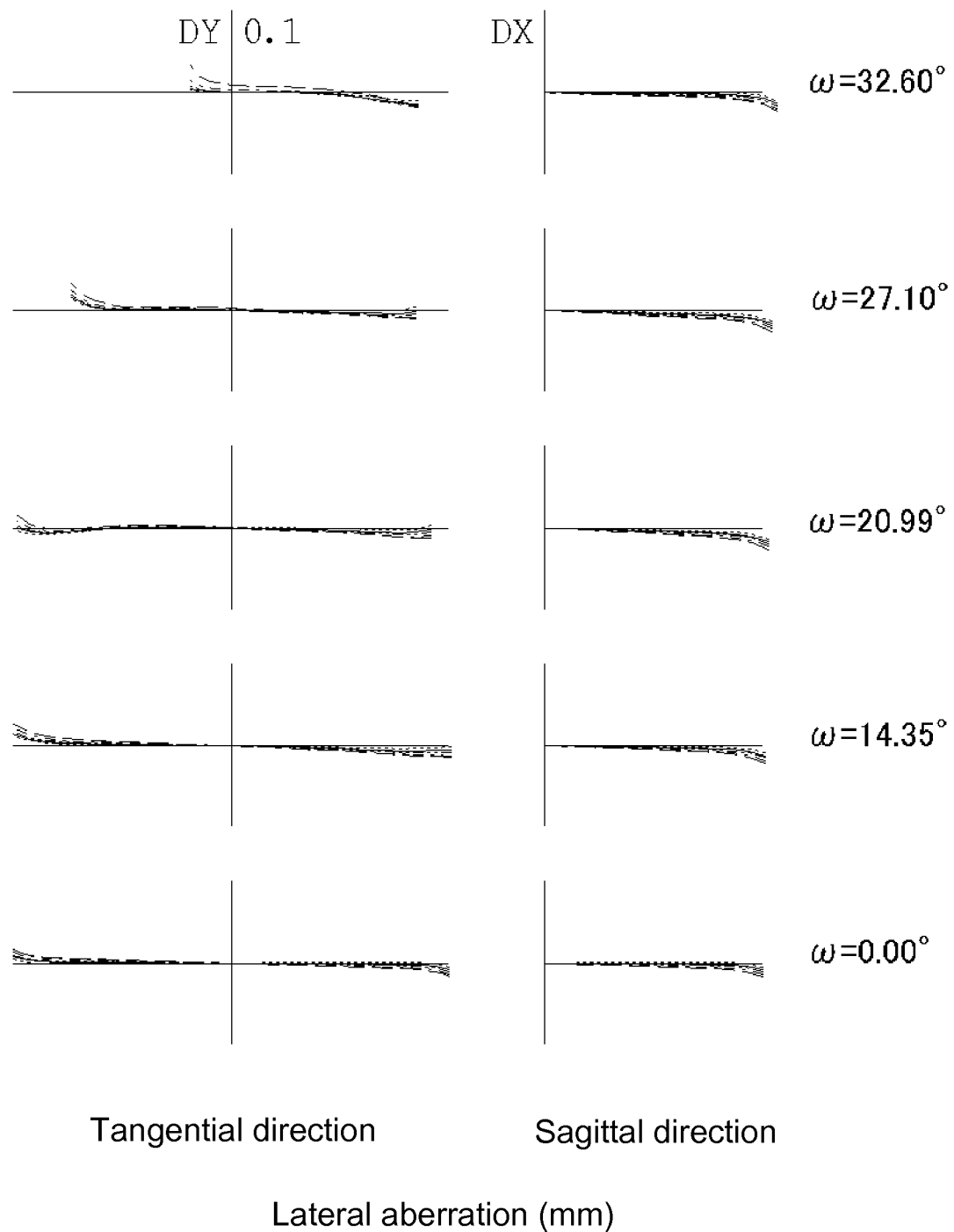
FIG. 17 is an aberration diagram showing a lateral aberration of the zoom lens of FIG. 16 at the wide-angle end.
Figure 18:
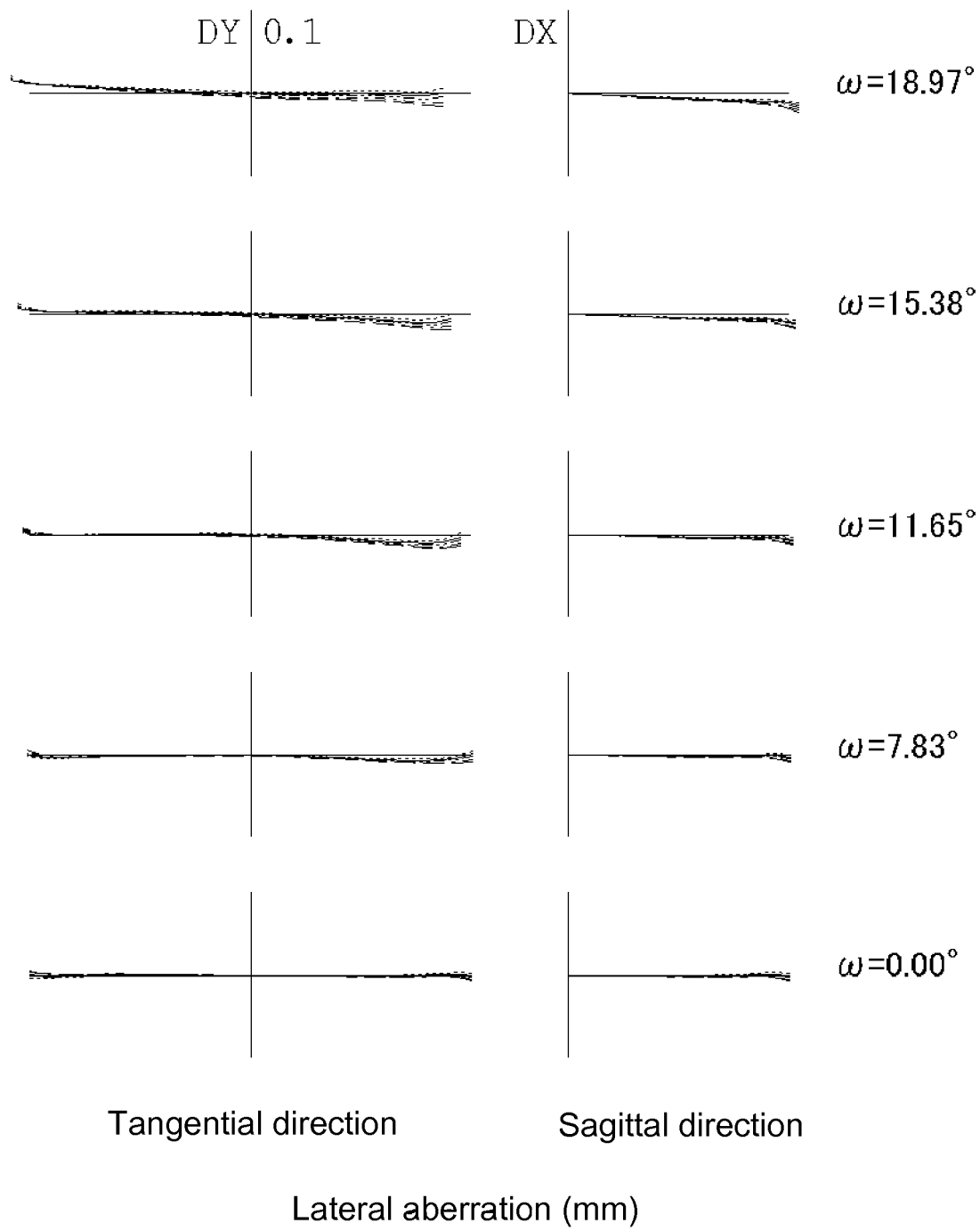
FIG. 18 is an aberration diagram showing a lateral aberration of the zoom lens of FIG. 16 at the mid point.
Figure 19:
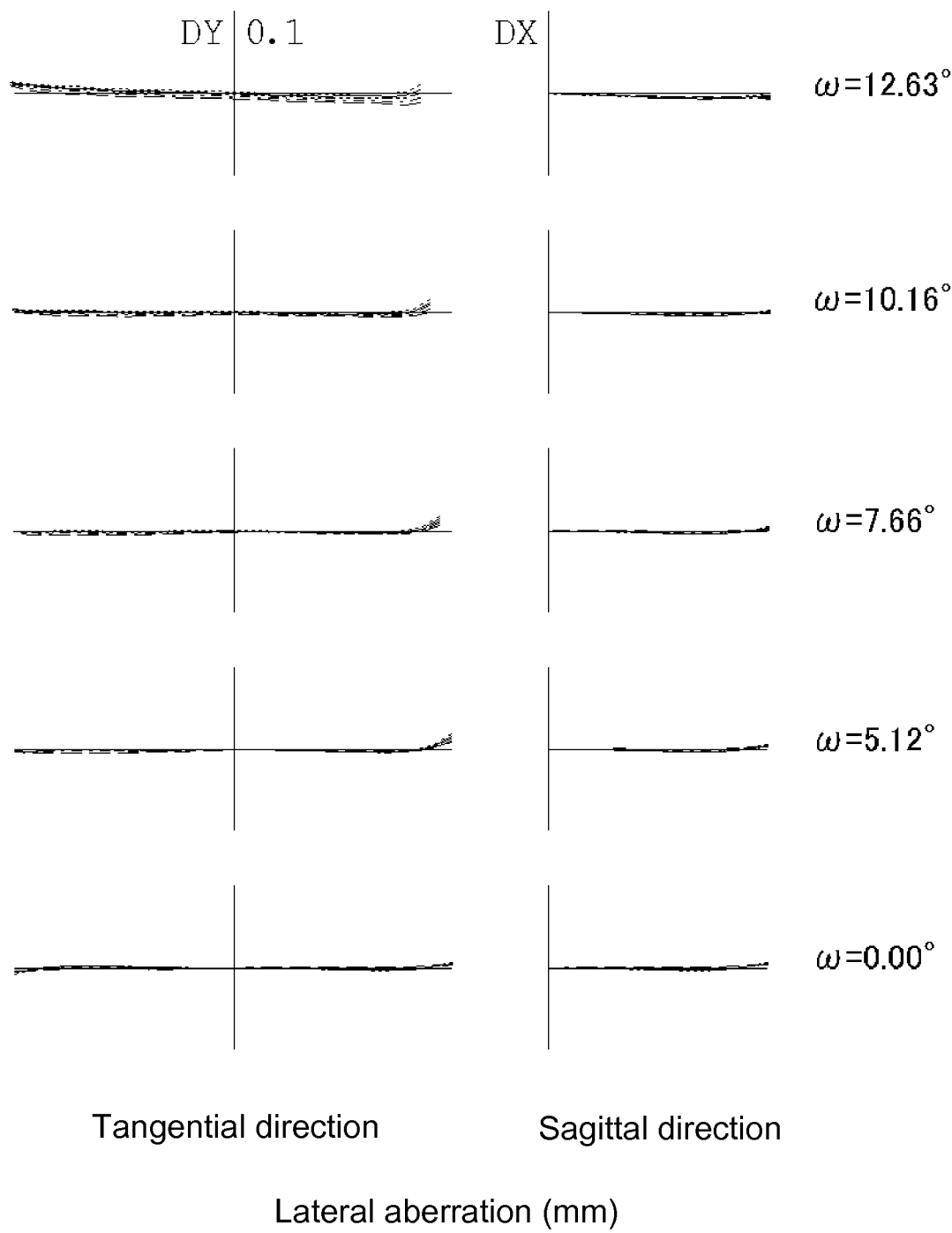
FIG. 19 is an aberration diagram showing a lateral aberration of the zoom lens of FIG. 16 at the telephoto end.
Figure 20:
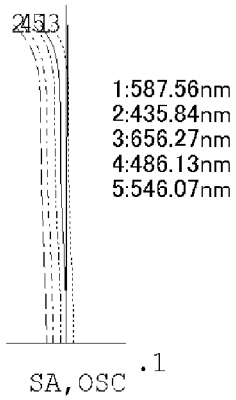
FIG. 20 is an aberration diagram showing a spherical aberration, an astigmatism, and a distortion of the zoom lens of FIG. 16.
Figure 20:
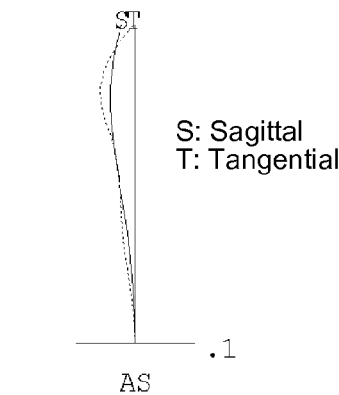
Figure 20:
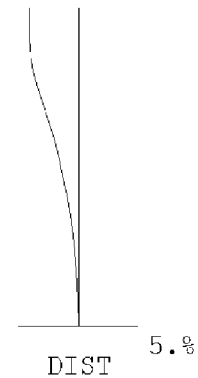
Figure 20:
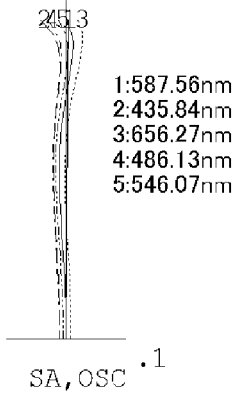
Figure 20:
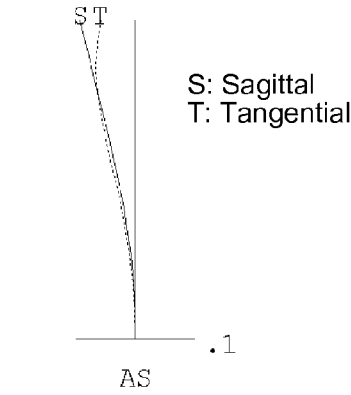
Figure 20:
Figure 20:
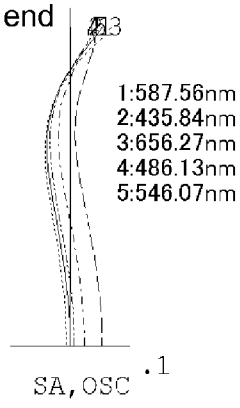
Figure 20:
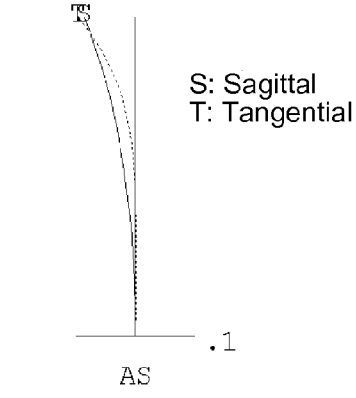
Figure 20:
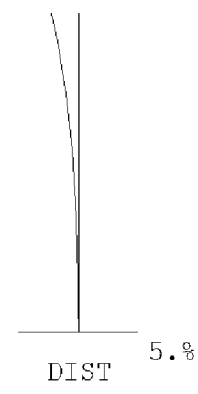

Accordingly, the zoom lens of Numerical Data Example 4 satisfies the conditional expressions (1) to (6). FIGS. 17 to 19 show lateral aberrations that correspond to the half angle of view ω in the zoom lens of Numerical Data Example 4. FIG. 20 shows the spherical aberration SA (mm), the astigmatism AS (mm), and the distortion DIST (%), respectively. Therefore, even with the zoom lens of Numerical Data Example 4, it is possible to satisfactorily correct image surface and suitably correct aberrations.

Therefore, when the zoom lens of the embodiment is applied in an imaging optical system such as cellular phones, digital still cameras, portable information terminals, and security cameras, it is possible to attain both high performances and miniaturization of the camera.

The invention may be applicable in a zoom lens for mounting on a device that requires satisfactory aberration correcting ability in addition to a small size thereof, for example, a device such as cellular phones or digital still cameras.

What is claimed is:

1. A zoom lens comprising:
    a first lens group having negative refractive power;
    a second lens group having negative refractive power;
    a third lens group having positive refractive power; and
    a fourth lens group having positive refractive power, arranged in an order from an object side to an image plane side,
    wherein said first lens group includes a first lens, a second lens, and a light path changing member disposed close to the image plane side relative to the first lens and the second lens for changing a traveling direction of an incident light,
    said second lens group includes a third lens having positive refractive power so that a curvature radius of a surface thereof on the object side is positive and a fourth lens having negative refractive power so that a curvature radius of a surface thereof on the object side is negative,
    said third lens group includes a fifth lens having positive refractive power and a lens unit having negative refractive power as a whole, and
    said first lens group and said fourth lens group are fixed, said second lens group moves to the object side and after moving to the image plane side, and said third lens group linearly moves to the object side when a magnification is changed from a wide-angle end to a telephoto end.

2. The zoom lens according to claim 1, wherein said first lens has positive refractive power so that a curvature radius of a surface thereof on the object side is positive, and said second lens has negative refractive power so that a curvature radius of a surface thereof on the image plane side is positive.

3. The zoom lens according to claim 2, wherein said first lens has a focal length f1p and said second lens has a focal length f1n so that the following conditional expression is satisfied:

$|f1n/f1p|<0.8$.

4. The zoom lens according to claim 2, wherein said first lens has an Abbe's number vd1p and said second lens has an Abbe's number vd1n so that the following conditional expression is satisfied:

$|vd1n-vd1p|<30$.

5. The zoom lens according to claim 1, wherein said light path changing member includes a prism for reflecting the incident light to bend a light path thereof.

6. The zoom lens according to claim 1, wherein said first lens group includes a bonded lens formed of the first lens and the second lens, said bonded lens being disposed close to the object side relative to the light path changing member, said first lens being formed in a shape so that a curvature radius of a surface thereof on the object side is positive and a curvature radius of a surface thereof on the image plane side is negative, said second lens being formed in a shape so that a curvature radius of a surface thereof on the object side is negative and a curvature radius of a surface thereof on the image plane side is positive.

7. The zoom lens according to claim 1, wherein said first lens group includes the first lens and the second lens arranged close to the object side relative to the light path changing member, each of said first lens and said second lens being formed in shapes so that a curvature radius of a surface thereof on the object side and a curvature radius of a surface thereof on the image plane side are both positive.

8. The zoom lens according to claim 1, wherein said first lens group includes the first lens having negative refractive power and the second lens having positive refractive power, said first lens and said second lens being arranged in the order from the object side to the image plane side.

9. The zoom lens according to claim 8, wherein said first lens has a focal length f1n and said second lens has a focal length f1p so that the following conditional expression is satisfied:

$|f1n/f1p|<0.8$.

10. The zoom lens according to claim 8, wherein said first lens has an Abbe's number vd1n and said second lens has an Abbe's number vd1p so that the following conditional expression is satisfied:

$|vd1n-vd1p|<30$.

11. The zoom lens according to claim 1, wherein said first lens group has a focal length f1 and said second lens group has a focal length f2 so that the following conditional expression is satisfied:

$0.2<f2/f1<1.0$.

12. The zoom lens according to claim 1, wherein said first lens group has a focal length f1 and said third lens group has a focal length f3 so that the following conditional expression is satisfied:

$0.05<|f3/f1|<0.5$.

13. The zoom lens according to claim 1, wherein said first lens group, said second lens group, said third lens group, and said fourth lens group have a composite focal length fw at the wide-angle end, and said third lens group has a focal length f3 so that the following conditional expression is satisfied:

$1.0<f3/fw<2.0$.

14. The zoom lens according to claim 1, wherein said fifth lens has a focal length f3p and said lens unit has a composite focal length f3n so that the following conditional expression is satisfied:

$0.1<|f3p/f3n|<1.0$.

* * * * *